US008913514B2

(12) United States Patent
Maruyama et al.

(10) Patent No.: US 8,913,514 B2
(45) Date of Patent: Dec. 16, 2014

(54) COMMUNICATION CONTROL UNIT AND COMMUNICATION CONTROL SYSTEM

(75) Inventors: Tatsuya Maruyama, Hitachi (JP); Tsutomu Yamada, Hitachinaka (JP); Shinji Yonemoto, Narashino (JP); Takashi Iwaki, Ichihara (JP); Hironori Ohashi, Narashino (JP); Yutaka Matsumoto, Narashino (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 13/213,545

(22) Filed: Aug. 19, 2011

(65) Prior Publication Data

US 2012/0057479 A1 Mar. 8, 2012

(30) Foreign Application Priority Data

Sep. 6, 2010 (JP) ................................. 2010-198520

(51) Int. Cl.
| | |
|---|---|
| H04J 1/16 | (2006.01) |
| H04J 3/14 | (2006.01) |
| H04L 12/26 | (2006.01) |
| H04L 12/28 | (2006.01) |
| G05B 19/418 | (2006.01) |
| H04L 12/413 | (2006.01) |
| H04J 3/06 | (2006.01) |
| G06F 1/12 | (2006.01) |

(52) U.S. Cl.
CPC .......... *H04L 12/413* (2013.01); *G05B 19/4185* (2013.01); *H04J 3/0667* (2013.01)
USPC ............................ 370/252; 370/503; 713/400

(58) Field of Classification Search
USPC .................... 370/503, 252; 713/400
See application file for complete search history.

(56) References Cited

U.S. PATENT DOCUMENTS

| | | | |
|---|---|---|---|
| 6,199,169 B1 * | 3/2001 | Voth .............................. | 713/400 |
| 8,259,758 B2 * | 9/2012 | Chen et al. .................... | 370/503 |
| 2011/0184533 A1 | 7/2011 | Maruyama et al. | |

FOREIGN PATENT DOCUMENTS

| | | |
|---|---|---|
| JP | 09-238127 | 9/1997 |
| JP | 2008-187235 | 8/2008 |

(Continued)

OTHER PUBLICATIONS

IEEE Standard for a Precision Clock Synchronization Protocol for Networked Measurement and Control Systems, IEEE Std 1588$^{th}$-2008, Jul. 24, 2008.

(Continued)

*Primary Examiner* — Helal A Algahaim
*Assistant Examiner* — Mahmoud Ismail
(74) *Attorney, Agent, or Firm* — Antonelli, Terry, Stout & Kraus, LLP.

(57) ABSTRACT

A communication control unit and a communication control system are provided in which control devices can synchronously operate. In a communication control system in which a communication control unit and multiple control devices having an actuator to operate a control target are connected via a network, the communication control unit provides a control command to the control devices, synchronizes times of the communication control unit and the control devices, obtains communication delays relative to the control devices, collects control start times of the control devices, obtains a time by subtracting the control start time from a predetermined time as a start time of the control device, calculates a time obtained by subtracting the communication delay from the start time for each control device, and transmits the control command to the control devices before the earliest time of the calculated times.

19 Claims, 25 Drawing Sheets

(56) References Cited

FOREIGN PATENT DOCUMENTS

| | | |
|---|---|---|
| JP | 2009-218732 | 9/2009 |
| JP | 2011-155451 | 8/2011 |

OTHER PUBLICATIONS

JP Office Action for Japanese Application No. 2010-198520, issued on Oct. 16, 2012.

* cited by examiner

US 8,913,514 B2

COMMUNICATION CONTROL UNIT AND COMMUNICATION CONTROL SYSTEM

CLAIM OF PRIORITY

The present application claims priority from Japanese Patent application serial no. 2010-198520, filed on Sep. 6, 2010, the content of which is hereby incorporated by reference into this application.

FIELD OF THE INVENTION

The present invention relates to a communication control system connected to control devices via a network to control targets to be controlled and to a communication control unit used therein.

BACKGROUND OF THE INVENTION

Communication control systems include a configuration in which one or multiple controllers (control devices) are connected via a network and the controllers transmit control commands, etc. to one or multiple targets to be controlled via the network to control the targets. Networks used for such a communication control system include Ethernet (registered trademark), RS-232C, RS-422, RS-485, CAN (registered trademark), DeviceNet, MECHATROLINK (registered trademark), CC-Link (registered trademark), EtherCAT (registered trademark), etc.

In a communication control system in which multiple control devices are connected via a network, each control device may be required to operate synchronously in some cases. The above phrase "to operate synchronously" means that each control device follows a control law common in the communication control system and a timing of a sensor input of each control device used in calculations of the control law and a timing of an actuator output introduced from the control law are not offset in any control device.

For example, in an industrial robot arm having multiple joints, when each joint is formed of a servomotor, a desired trajectory of the robot arm cannot be obtained unless operations of the servomotors synchronize. The synchronization precision required in a communication control system may need to be higher as a control capability required in the communication control system becomes higher.

Therefore, to synchronously operate each control device forming a communication control system, technologies of a real-time communication protocol and a synchronization protocol have been developed.

Patent Document 1, JP-A No. 2008-187235, "A network system and slave synchronization method," and Non-patent Document 1, IEEE 1588-2008 "IEEE Standard for a Precision Clock Synchronization Protocol for Networked Measurement and Control Systems," disclose such communication technologies. For example, Patent Document 1 discloses a method in which a communication control unit notifies each control device of an operation start time to synchronize an operation time of each control device. Non-patent Document 1 is a standard showing a procedure of executing a synchronization protocol.

As stated above, "to operate synchronously," each follows a control law common in the communication control system and a timing of a sensor input of each control device used in calculations of the control law and a timing of an actuator output introduced from the control law may be required not to offset in any control device.

This means that both an issue of the communication side and an issue of the control side may be required to be addressed. First, the issue of the control side is examined. This examination is conducted on the premise that the issue of the communication side mentioned later has been solved and only the issue of the control side remains.

However, though the issue of the communication side has been solved by synchronization of each control device, significant operations on a control system in each control device cannot be synchronized. This is because a different delay actually occurs in each control device until a significant operation on a communication control system even when each control device can start its operation from a predetermined synchronized time of a time scale. For example, when an output to a motor is taken as an example and a motor output is assumed as "a significant operation," each control device applies an operation output to a motor connected to each control device. A time from reception of an operation command by each control device to a motor output may be different in each control device. This is because a configuration of each control device is different and a time taken from when the motor receives the operation output until the motor actually operates in response to the operation output is different in each control device.

On the other hand, when the issue of the communication side is examined, it is effective to connect between a communication control unit and each control device with a real-time communication protocol. However, even in such a technique, a cycle in which each control device receives a control command from the communication control unit is offset. This issue is explained in reference to FIG. 17.

FIG. 17 shows a situation in which a control command D is transmitted from a communication control unit 20 to three control devices 21. The Tai is a time at which the control device in a cycle i starts its operation. Here, the communication control unit 20 transmits control commands D0 and D1 at times t0 and t4, respectively, and the control devices 21 receive the control commands D0 and D1 at different cycles, respectively.

For this reason, in the example of FIG. 17, in a control period 1 starting from the time Ta1, each control device receives a different control command from the communication control unit 20 in executing processing. At this time, the control devices 21$b$ and control device 21$c$ have not received the control command D0 while the control device 21$a$ has received the control command D0. In a control period 2 starting from a time Ta2, when each control device executes processing, the control device 21$a$ and control device 21$b$ have received the control command D1, but the control device 21$c$ has not received the control command D1. For this reason, in the control period 2 starting from time the Ta2, the control device 21$a$ and control device 21$b$ can execute processing of the control command D1, and the control device 21$c$ performs processing of the control command D0.

This is because a transmission time of the control command D from the communication control unit 20 is not controlled. Additionally, since calculation of the control command D is usually performed by software which operates on a CPU and an embedded processor, the transmission cycle of a transmission-command request may be large relative to a control period. Alternatively, in addition to reduction of the precision due to the execution by software, reduction of the precision may occur at timing at which a command is transmitted from a CPU and an embedded processor to communication hardware due to a bus protocol between the CPU and the embedded processor.

With respect to this point, in the technology of Patent Document 1, the communication control unit 20 collects a control start time of each control device 21 and notifies each control device 21 of a wait time taken from a reception of the control command D to a start of an operation. Therefore, a significant operation time can be synchronized in a communication control system.

However, in this technology, a communication time for using the network is assigned to each control device. Therefore, a control cycle is an integrated value of communication delays to respective control devices. Therefore, the control cycle becomes longer as the number of control devices increases.

For addressing both the issue of the communication side and the issue of the control side, the present invention aims to provide a communication control unit in which each control device can operate synchronously, and a communication control system.

SUMMARY OF THE INVENTION

In the present invention, for addressing the above issues, a communication control unit connected via a network to multiple control devices each having an actuator to operate a control target includes: a control command calculation section for calculating control commands for the control devices; a synchronization section for synchronizing times of the communication control unit and the control devices and measuring communication delays between the communication control unit and the control devices; a communication delay storage section for storing the communication delays measured by the synchronization section; a control start time collection section for collecting control start times of the control devices; a control start time storage section for storing the control start times collected by the control start time collection section; a cycle start time control section for determining a time obtained by subtracting a control start time stored in the control start time storage section from a predetermined time as a start time of a control device; a cycle start time storage section for storing a start time determined by the cycle start time control section; a communication section for communicating a control command of the control command calculation section with a network; and a transmission time control section for calculating, for each control device, a time obtained by subtracting a time of a communication delay stored in the communication delay storage section from a start time stored in the cycle start time storage section and notifying the communication section of a control command of the control command calculation section before the earliest time in the calculated times.

Advantageous Effect of the Invention

A communication control unit and a communication control system whose control capabilities are improved can be provided.

DETAILED DESCRIPTION OF THE PREFERRED EMBODIMENTS

Hereafter, a communication control system of the present invention is explained in detail in reference to the appended drawings.

Embodiment 1

Figure 3:
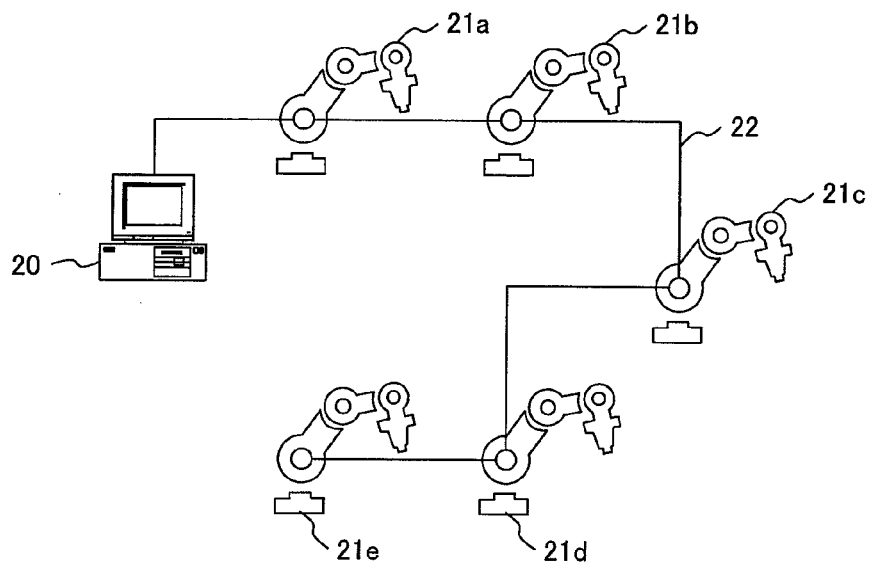
FIG. 3 shows one example of a schematic configuration of a communication control system.
Figure 4:
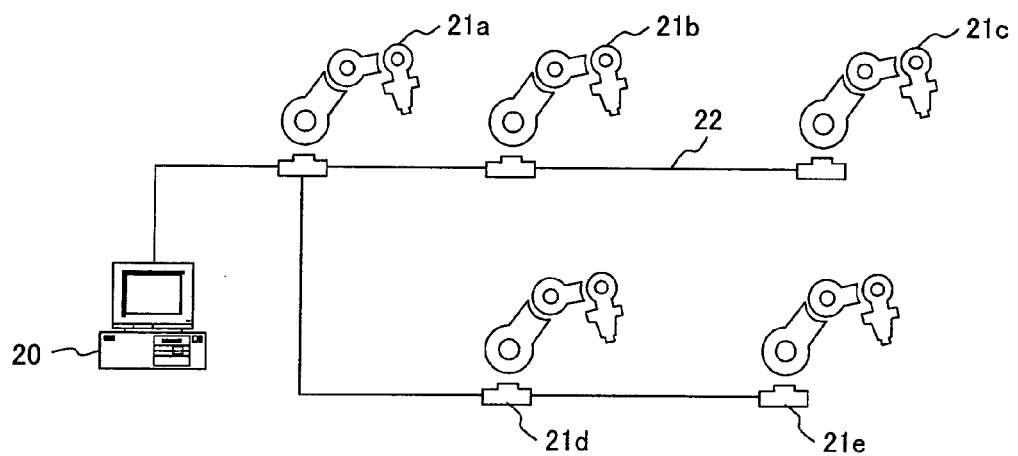
FIG. 4 shows one example of the schematic configuration of the communication control system.

FIG. 3 and FIG. 4 show an example of the schematic configuration of a communication control system in which a communication control unit 20 and each control device 21 are connected via a network. FIG. 3 shows the example in which each control device 21 is connected to a network 22 in series, and FIG. 4 shows the example in which a branching point is present in the middle of the network 22.

In these Figures, the communication control unit 20 synchronizes times of the communication control unit 20 and control devices 21 forming the network 22 and transmits and receives control commands and management information to and from each control device 21.

The control device 21 receives a control command from the communication control unit 20 and performs control processing. Management information is communicated to the communication control unit when needed. A configuration by a servo amplifier and a servomotor is illustrated as an actuator of the control device 21.

The network 22 connects the communication control unit 20 and control devices 21. Examples of the network 22 include Ethernet (registered trademark), Industrial Ethernet (registered trademark) defined by IEC61784, CAN ((registered trademark) Controller Area Network), DeviceNet, RS-232C, RS-422, RS-485, MECHATROLINK (registered trademark), CC-Link (registered trademark), etc. This embodiment explains EtherCAT ((registered trademark) Communication Profile Family 12 of IEC61784 part 2) as an example of the network 22.

In Ether CAT (registered trademark), a communication frame transmitted from the communication control unit 20 returns to the communication control unit 20 via all the control devices 21 sequentially. For this reason, in the example of the configuration of FIG. 3 in which the control devices 21 are connected in series, a communication frame returns to the communication control unit 20 via 21a, 21b, 21c, 21d, 21e, 21d, 21c, 21b, and 21a in this order. As one example of the order of the control devices 21 branching on their way in FIG. 4, the communication frame returns to the communication control unit 20 via 21a, 21b, 21c, 21b, 21a, 21d, 21e, 21d, and 21a in this order.

Figure 1:
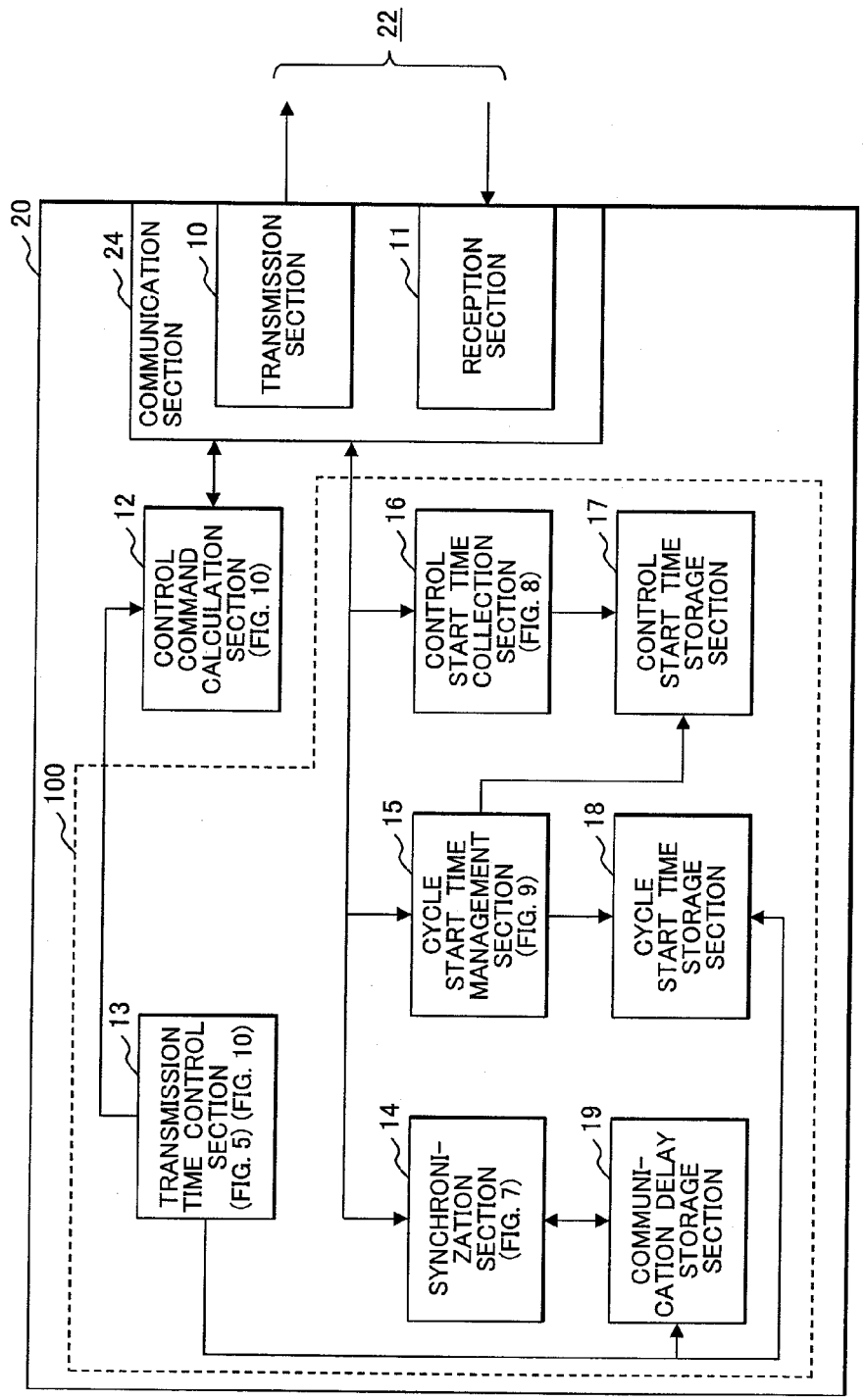
FIG. 1 shows one embodiment of a functional configuration of a communication control unit 20.
Figure 2:
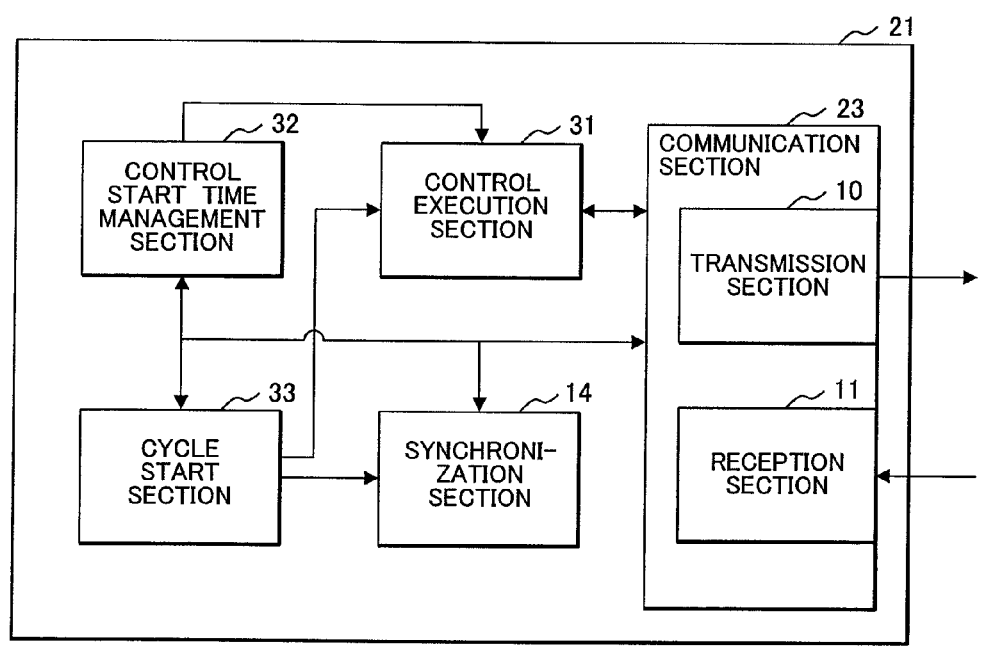
FIG. 2 shows one embodiment of a functional configuration of a control device 21.

Next, a configuration of the communication control unit 20 connected to the network 22 and control devices 21 is explained sequentially in reference to FIG. 1 and FIG. 2.

First, FIG. 1 shows one embodiment of the functional configuration of the communication control unit 20. FIG. 1 can be functionally divided roughly into a communication section 24, a control command calculation section 12, and a synchronization management section 100.

The communication section 24, which is the first function, is a functional section connected to the network 22 to communicate according to a communication protocol of the network 22 and includes a transmission section 10 and a reception section 11. The transmission section 10 is a transmission function section in the communication section 24 and transmits packets from the communication control unit 20 to the network 22. The reception section 11 is a reception function section in the communication section 24 and receives packets transmitted from the network 22.

The control command calculation section 12, which is the second function, calculates a control command D to be transmitted from the communication control unit 20 to the control device 21. The control command calculation section 12 transmits the calculation result to the transmission section 10. The control command calculation section 12 receives a sensor value of the control device 21 from the reception section 11. The control command calculation section 12 calculates a control command based on the received value when performing a feedback control, etc. However, a transmission time control section 13 in the synchronization management section 100 controls a time transmitted to the transmission section 10.

The synchronization management section 100, which is the third function, forms a core of the present invention and permits each control device 21 to operate synchronously when the transmission time control section 13 controls a transmission time appropriately. In the present invention, to realize the synchronization, communication delays from the communication control unit 20 to each control device 21, cycle start times of the control devices 21, and control start times of the control devices 21 are managed. The details of these management items are explained separately. The management and adjustment are made mainly by the transmission time control section 13 of the synchronization management section 100.

Hereafter, the schematic functional configuration of the synchronization management section 100 is described previously. First, the transmission time control section 13 determines a time at which the control command D calculated by the control command calculation section 12 is transmitted to the transmission section 10. The transmission time is determined in reference to a communication delay from the communication control unit 20 until each control device 21 and a cycle start time which is set to each control device 21. The communication delay storage section 19 stores the communication delays. The cycle start time storage section 18 stores the cycle start times. The transmission time control section 13 manages operations of the synchronization section 14, cycle start time management section 15, and control start time collection section 16.

Figure 5:
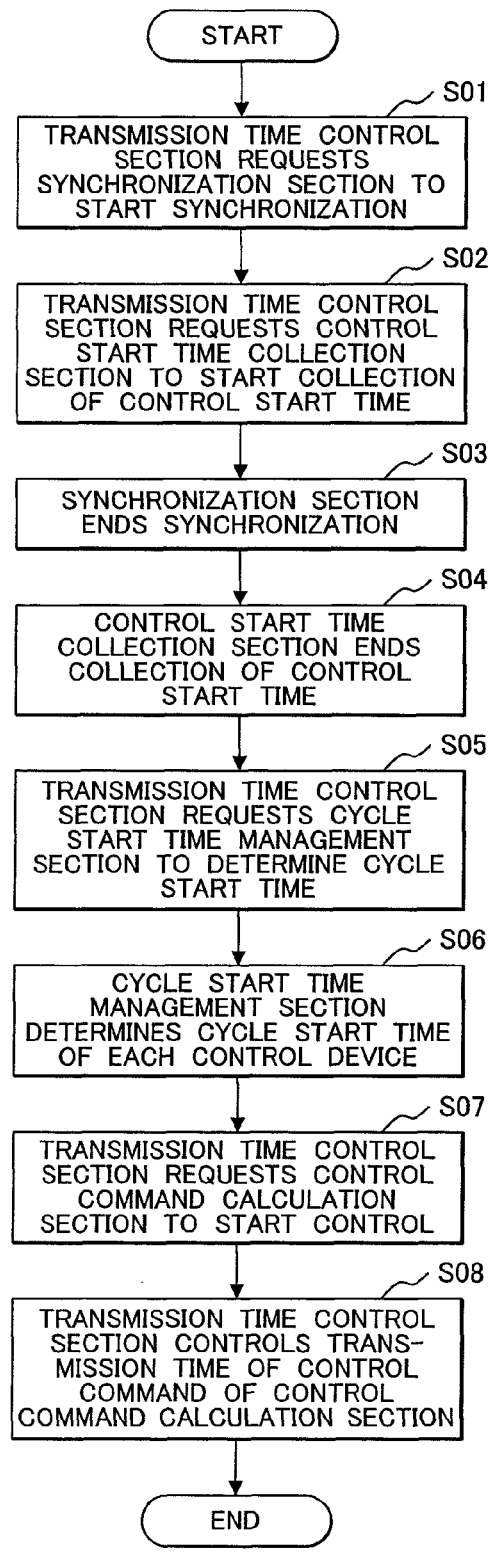
FIG. 5 shows a processing flow of a synchronization section 13.

Particular operations of the transmission time control section 13 to manage and adjust the inside of the synchronization management section 100 are explained separately in reference to the flowchart of FIG. 5. The processing flow in which results of the management and adjustment are transmitted to the control command calculation section 12 and reflected in the control devices 21 is separately explained in reference to the flowchart of FIG. 10.

Of the three management items (communication delays, cycle start times, and control start times) in the present invention, the communication delays are managed by the communication delay storage section 19 and synchronization section 14. The communication delay storage section 19 stores a communication delay from the communication control unit 20 until each control device 21. The communication delay is measured and calculated by the synchronization section 14 and recorded in the communication delay storage section 19. Particular operations of the synchronization section 14 started in response to an instruction from the transmission time control section 13 are separately explained in reference to the flowchart of FIG. 7.

The cycle start time, which is the second management item, is managed by the cycle start time management section 15 and cycle start time storage section 18. The cycle start time management section 15 determines a cycle start time of each control device on the basis of the communication delay from the communication control unit 20 until each control device 21 and a control start time of each control device 21, and sets the cycle start time to each control device 21. The cycle start time storage section 18 stores the cycle start time determined by the cycle start time management section 15. Particular operations of the cycle start time management section 15 started in response to an instruction from the transmission time control section 13 are separately explained in reference to the flowchart of FIG. 9.

The control start time, which is the third management item, is managed by the control start time collection section 16 and control start time storage section 17. The control start time collection section 16 collects a control start time of each control device 21, and registers collected control start time into the control start time storage section 17. The control start time storage section 17 stores control start times collected by the control start time collection section 16. Specific operations of the control start time collection section 16 started in response to an instruction from the transmission time control section 13 are separately explained in reference to the flowchart of FIG. 8.

On the other hand, an example of the functional configuration of the control device 21 is shown in FIG. 2. First, similarly to the synchronization section 14 of the communication control unit 20, the synchronization section 14 realizes synchronization on the network 22. However, in the case of a synchronization protocol having a master-slave configuration, the synchronization section 14 may be either a master or a slave. As one example, the synchronization section 14 of the communication control unit 20 serves as a master, and the synchronization section 14 of the control device 21 serves as a slave. The role of the slave in the synchronization protocol is, e.g., to return required information in response to requirement from the master and to set time information received from the master.

Contents of execution of the control execution section 31 include: execution of a predetermined operation in response to the control command D from the communication control unit 20 as an actuator; acquisition of predetermined external information and transmission of this information to the communication control unit 20 as a sensor; and execution of a control calculation based on a target value transmitted from the communication control unit 20 to perform a predetermined operation as a controller. Operation start times of the operations are controlled by the cycle start section 33.

Figure 18:
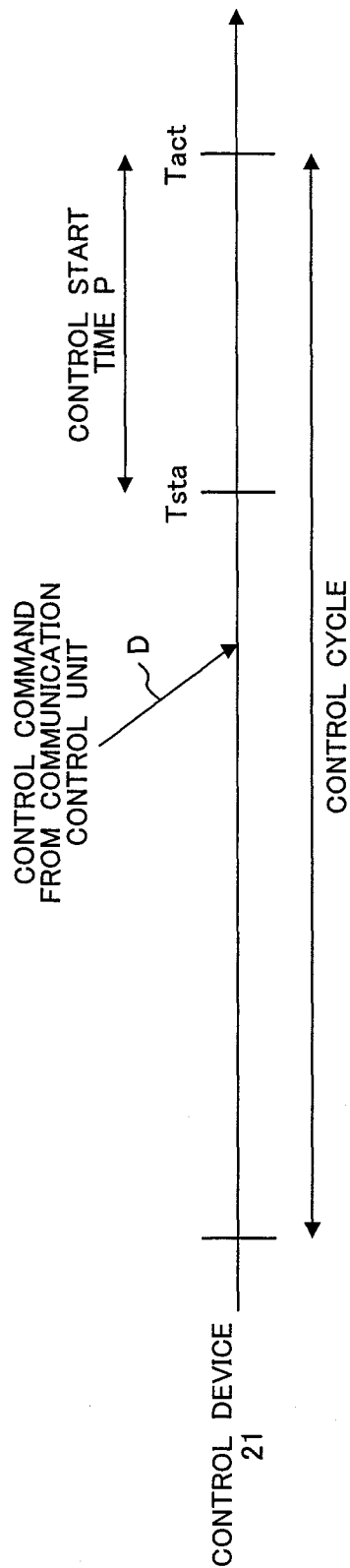
FIG. 18 shows operations of each function section of the control device.

Operations of each functional section of the control device 21 are explained using FIG. 18. The horizontal axis shows a time in this figure. The cycle start section 33 starts the control execution section 31 periodically on the basis of the rule of a periodic operation set by the communication control unit 20. The control execution section 31 may be started predetermined times instead of periodically.

A control period is formed within the control device 21 each predetermined time. The Tsta is a time at which the control execution section 31 is started by the cycle start section 33 and starts its operation. The Tact is a time at which an operation of the control device 21 has been executed. Here, a time P from Tsta until Tact is a control start time, which is one of the management items of the present invention. The control execution section 31 performs an operation based on the latest control command D received before Tsta. The processing of this operation may be changed according to a reception time of a control command and a state of the control execution section 31. For example, when a predetermined time has elapsed since the reception time, the control command D is considered to be old and thus not reflected in the processing.

The control start time management section 32 acquires a time (control start time (P of FIG. 18)) from the operation start time Tsta of the control execution section 31 until the time Tact at which a significant operation is actually made as a system, and transmits it to the communication control unit 20. Accordingly, control start times of the control devices are stored by the control start time storage section 17 in the communication control unit 20 of FIG. 1.

On the premise that the communication control unit 20 has a function as shown in FIG. 1 and the control device 21 has a function as shown in FIG. 2 to carry out the response of FIG. 18, an operation of each section is explained in detail below.

FIG. 5 shows particular operations of the transmission time control section 13 of FIG. 1 to manage and adjust the inside of the synchronization management section 100. According to this flowchart, in Step S01 at first, the transmission time control section 13 requires the synchronization section 14 to start a synchronization function. In Step S02, the transmission time control section 13 requires the control start time collection section 16 to start collection of a control start time of each control device 21. The order of the start request to the synchronization section 14 and the start request to the control start time collection section 16 is not fixed or these requests may be executed simultaneously.

After termination of synchronization by the synchronization section 14 and termination of collection of a control start time by the control start time collection section 16 are confirmed in Step S03 and Step S04 respectively, the transmission time control section 13 in Step S05 requires the cycle start time management section 15 to determine a cycle start time.

In Step S06, the cycle start time management section 15 determines a cycle start time of each control device 21 in a time scale synchronized by the synchronization section 14 on the basis of the control start time P of each control device 21 collected by the control start time collection section 16.

In Step S07, the transmission time control section 13 requires the control command calculation section 12 to start control processing after the determination of the cycle start time by the cycle start time management section 15.

In Step S08, the transmission time control section 13 controls a transmission time of the control command of the control command calculation section 12 on the basis of the cycle start time determined by the control start time control section 15 and a communication delay measured by the synchronization section 14.

As stated above, the functions of the sections in the synchronization management section 100 operate based on commands of the transmission time control section 13. Next, functions included basically in the functional sections and a procedure executed based on commands from the transmission time control section 13 are explained in detail.

First, operations of the synchronization section 14 are explained. The synchronization section 14 synchronizes times of the communication control unit 20 and control device 21 forming the network 22 according to a predetermined synchronization protocol. The synchronization section 14 measures a communication delay from the communication control unit 20 until each control device 21 for synchronization.

The fundamental function of the synchronization section 14 is to synchronize times of the communication control unit 20 and control devices 21 connected to the network 22. In this case, the synchronization protocol itself may use a standard one or original one. The time for synchronization may be a global common time such as the Coordinated Universal Time or any time common within the communication control system.

However, it is necessary to select a synchronization protocol having precision required by the communication control system. For example, NTP (Network Time Protocol) may be selected when precision of a ms unit or rougher is sufficient, and IEEE 1588 may be selected when it is necessary to synchronize times with higher precision.

In either case, when the present invention is applied, measurement of a communication delay between the communication control unit 20 and each control device 21 may be required in the procedure of the synchronization.

When there is no mechanism for measuring a communication delay in the synchronization section 14, a mechanism for measuring a communication delay may be needed separately.

In one example of measuring a communication delay after synchronization has been done, a packet carrying information about a transmission time is transmitted from the communication control unit 20 to the control device 21, and a difference between a time at which the control device 21 receives the packet and the transmission time stored in the packet is set as a communication delay.

Here, a procedure of a synchronization protocol of EtherCAT (registered trademark) is explained as a communication delay measurement technique. The synchronization function of EtherCAT (registered trademark) includes three stages: communication delay measurement between slaves; offset compensation of a clock of each slave; and drift compensation of gain of a clock in each slave.

Figure 6:
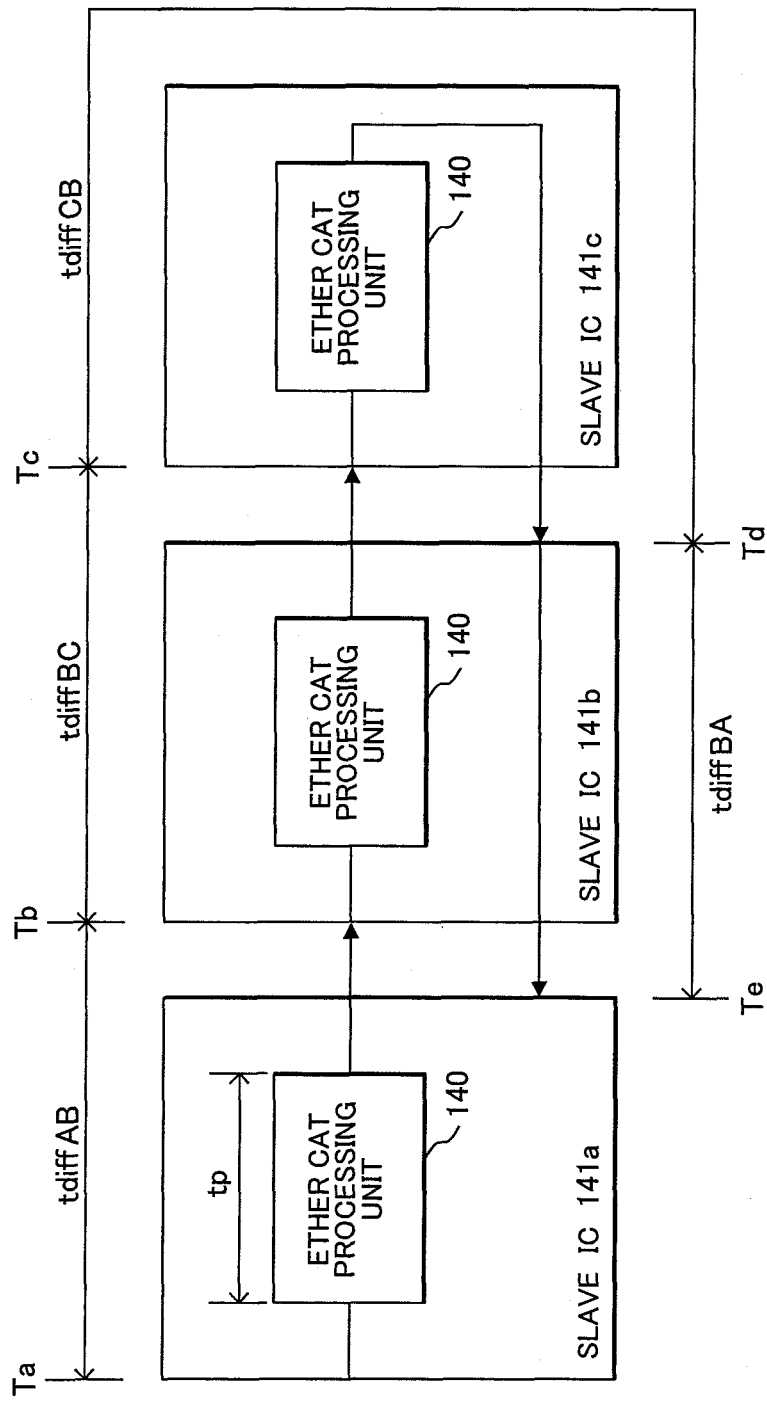
FIG. 6 shows a method of measuring communication delays between each slave.

The measurement of a communication delay between each slave is explained in reference to FIG. 6. FIG. 6 shows a communication path of a packet in each slave IC 141 of an EtherCAT (registered trademark) slave and reception times in communication ports. However, Ta, Tb, Tc, Td, and Te of FIG. 6 are reception times of packets in respective ports, and tdiff is a communication delay between slaves. The tp is a processing time of EtherCAT Processing Unit 140.

Focusing on a slave IC 141, Ta and Te are both measured by a clock on the slave IC 141a but cannot be compared to Tb and Td directly because offset and drift of the clock of slave IC 141a differ from those of slave IC 141b. Here, it is assumed that Ta to Te of FIG. 6 can be measured and tp has been known. A communication delay tdiffBC between the slave IC 141b and slave IC 141c can be expressed by Formula (1).

[Formula 1]

$$tdiffBC=(Td-Tb)/2 \quad (1)$$

wherein (Tc−Tb) is equal to (Td−Tc) EtherCAT slaves are assumed to use the same type processor units. When the processor units differ, it may be necessary to take a difference between each tp into consideration.

A communication delay tdiffAB between the slave IC 141b and slave IC 141a is obtained by the following Formula (2).

[Formula 2]

$$tdiffAB=((Te-Ta)-(Td-Tb)-tp)/2+tp \quad (2)$$

A communication delay tdiffBA between the slave IC 141b and slave IC 141a is obtained by Formula 2 and Formula 3 using the processing time tp of the EtherCAT Processing Unit 140.

[Formula 3]

$$tdiffBA=tdiffAB-tp \quad (3)$$

An EtherCAT slave which does not support a synchronization function is considered to be just a communication path. In other words, the EtherCAT slave which does not support the synchronization function may need to transmit a packet by a predetermined communication delay.

Figure 7:
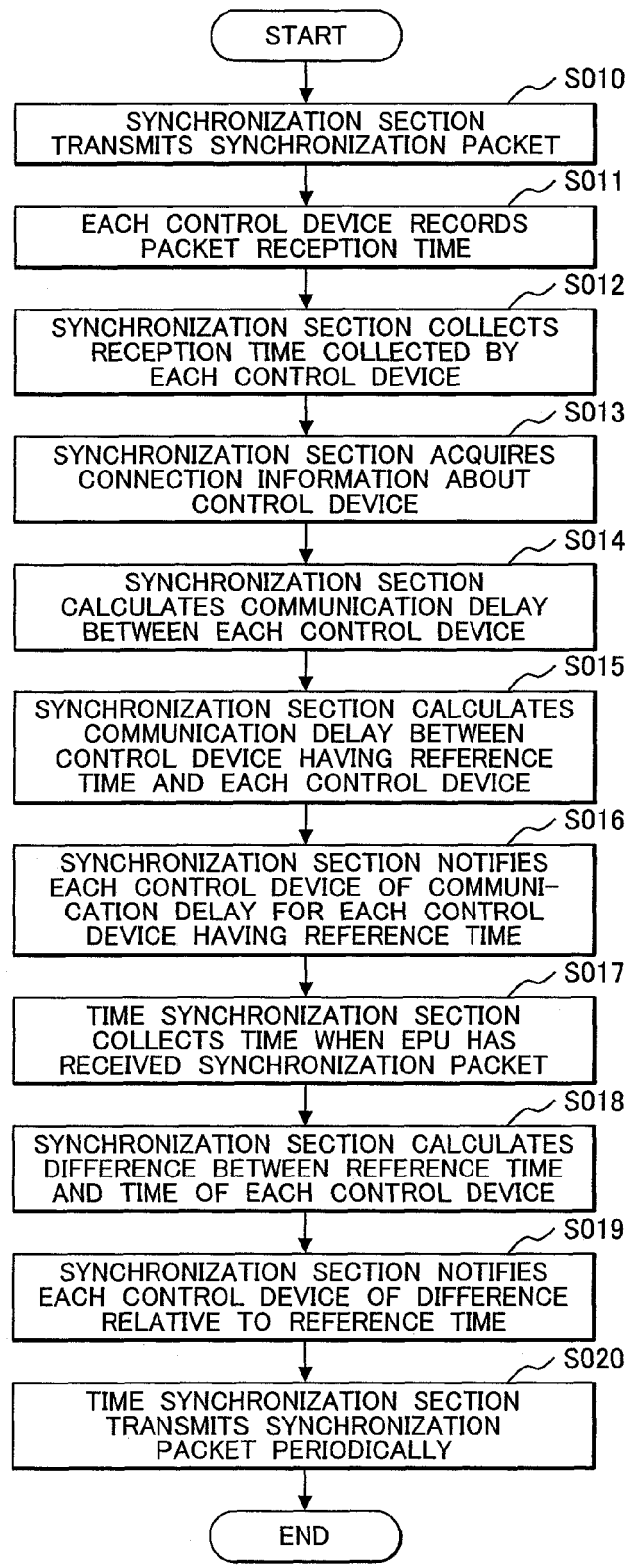
FIG. 7 shows a flowchart showing particular operations of the synchronization section.

On the above premise, synchronization and communication delay measurement are performed in the synchronization section 14 according to the flow of FIG. 7. This processing is performed in response to the synchronization start instruction in Step S01 of FIG. 5 in the transmission time control section 13.

In Step S010 of FIG. 7, at the beginning, the synchronization section 14 transmits a synchronization packet to the network 22. In response to this, in Step S011, each control device 21 records a reception time of the packet in each communication port. The synchronization section 14 collects the reception time recorded by each control device 21 (Step S012).

Next, the synchronization section 14 acquires connection information of the control devices 21 in Step S013. To acquire the connection information, a configuration file describing information about the network 22 in advance is read or port information about each control device 21 is read by communications to configure the connection information. The connection information may be acquired before transmission of a synchronization packet in Step S010.

Next, in Step S014, the synchronization section 14 calculates collected reception times of the control devices 21 and communication delays between the control devices 21 in reference to the acquired connection information. A communication delay between the control devices 21 equivalent to the connection relationship between the slave IC 141b and slave IC 141c of FIG. 6 is computed by Formula (1). A communication delay between the control devices 21 equivalent to the connection relationship between the slave IC 141a and slave IC 141b of FIG. 6 is calculated from Formula (2) or Formula (3).

After a communication delay between the adjacent control devices 21 is calculated, a communication delay between the control device 21 having a reference time and each control device 21 is calculated. In this calculation, based on the connection information, a communication delay between the control device 21 having a reference time and the target control device 21 may be added in the routing order of a packet. For example, a communication delay between the slave IC 141a and slave IC 141c of FIG. 6 is a sum of tdiffAB and tdiffBC. A reference time of the communication control unit 20 may be used instead of that of the control device 21. In this case, a communication delay between the communication control unit 20 and each control device 21 may be required to be calculated.

Then, in Step S016, the synchronization section 14 notifies each control device 21 of a communication delay calculated in Step S015. Thus, the communication delay is checked and then synchronization is performed.

Next, in Step S017, the synchronization section 14 collects times when the EtherCAT Processing Unit 140 receives a synchronization packet from the control devices 21.

Subsequently, a difference between a reception time Tr of a synchronization packet collected from each control device 21 in Step S018 and a reception time Tref in the control device 21 having a reference time is calculated. A difference D is calculated by Formula (4). Here, Pd is a communication delay between the control device 21 having the reference time and the control device 21 between which a difference De is obtained.

[Formula 4]

$$De=Tr-Tref-Pd \quad (4)$$

Next, in Step S019, the calculated difference De of the times is notified to each control device 21. Each control device 21 corrects its time by use of this difference. Specifically, a time of the control device 21 can be matched to the reference time by adding the difference to the time of the control device 21.

Hereinafter, in Step S020, a synchronization packet is periodically transmitted to the network 22. The control device 21 having the reference time attaches its own time to the synchronization packet on receipt of the synchronization packet. Each control device 21 corrects an offset of gain of a clock in reference to the reference time.

The synchronization and measurement of the communication delay shown in FIG. 7 may be performed only once at the initial operation of the system or at an arbitrary timing during the operation of the system after performed at the time of initial operation.

The synchronization section 14 records a communication delay of each control device 21 on the communication delay storage section 19 after termination of the synchronization.

Figure 8:
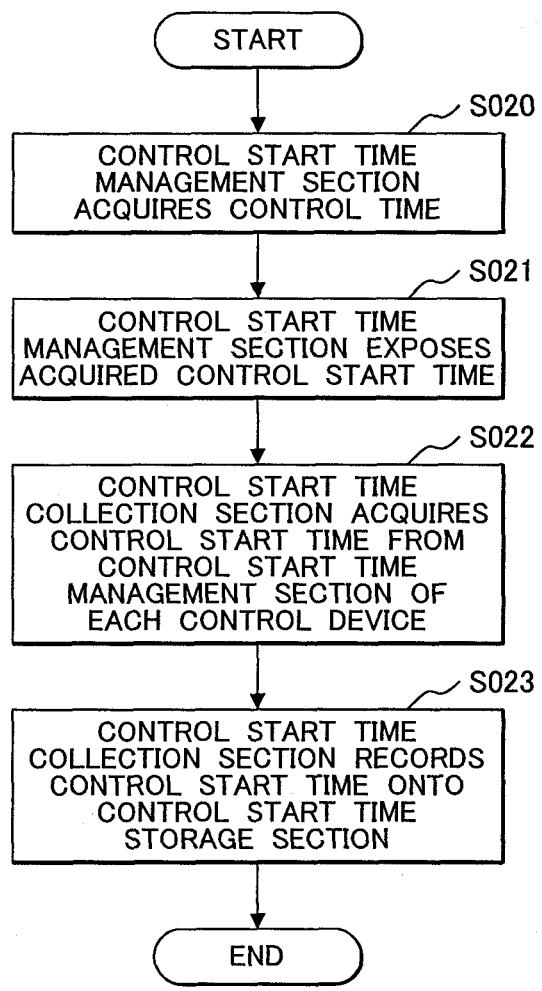
FIG. 8 shows a flowchart showing particular operations of a control start time collection section.

In the control start time collection section 16, control start times are collected according to the flow of FIG. 8. This collection is performed in response to a control start time collection start instruction in Step S02 of FIG. 5 in the transmission time control section 13.

As explained in FIG. 18, the control start time P is a time from the operation start time Tsta of the control until the time Tact when a significant operation on the communication control system is actually made in the time scale synchronized by the synchronization section 14. The procedure of the control start time collection section 16 to collect the control start time P of each control device 21 is explained in reference to FIG. 8.

Here, in the preparation (installation of the communication control system) before start of the function of the control start time collection section 16, a control start time is acquired in the control start time management section 32 (FIG. 2) of each control device 21 in Step S020. The control start time may be designed by a developer of the control device 21 or the control device 21 may include a way to measure the control start time. Such a measurement way may use a CPU, a timer of a microcomputer, or the synchronization section 14 which allows for output and input of interruption.

For example, the synchronization section 14 of FIG. 2 provides an interrupt output of an operation start time of the control. At this instant of time, the timer is started. The timer is stopped at the instant that a significant operation is made by the control device 21. Then, a control start time can be acquired. The measurement is repeated predetermined times in the initial stage before start of the communication control system. Then, its average value may be a control start time.

In the present invention, the control start time P is preferably constant. Therefore, when the control start time P changes, the control start time P may need to be fixed. To fix the control start time P, the control execution section 31 waits using a function of, e.g., a timer. This is shown in FIG. 19.

Figure 19:
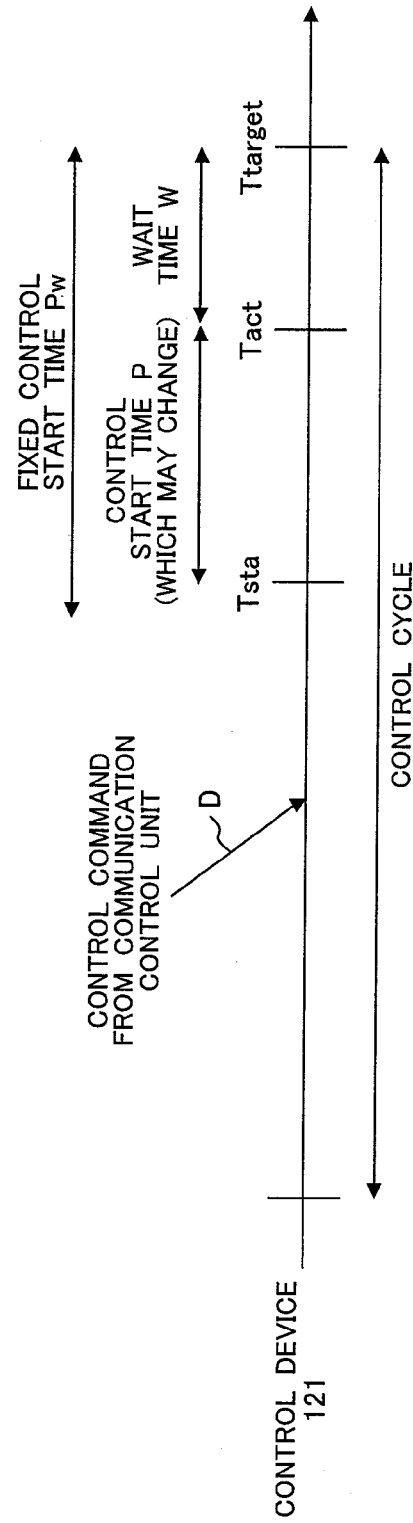
FIG. 19 shows processing for fixing a control start time.

In FIG. 19, when, in measuring the control start time P predetermined times (time from Tsta until Tact), the measurement values vary, a safety factor is added to the maximum one of the measurement values to obtain a target control start time Ttarget, until which the wait is performed by a wait time W. In this case, the control start time exposed by the control start time management section 32 is a fixed control start time Pw from Tsta until Ttarget.

When this fixed control start time Pw exceeds a control period, the control start time management section 32 notifies the communication control unit 20 of this excess. The communication control unit 20 which has received this notification exposes this information by use of a GUI (Graphical User Interface) or a file to developers and users of the communication control system. Thus, the developers and users of the communication control system can, e.g., change the control period and replace the control devices.

On the premise that the above processing is performed at or before the start, the control start time management section 32 of each control device 21 exposes the acquired control start time P to the communication control unit 20 in Step S021 on the actual operation. For example, as this exposure, a developer of the control device 21 defines a configuration file for each control device 21 in advance. In this definition, a region accessible by the communication control unit 20 is defined, and the control time management section 32 of each control device 21 exposes a control start time in the region.

For example, a control start time may be returned in response to connection to a predetermined port number by the UDP (User Datagram Protocol) communication. The communication control unit 20 can be aware of a field where control start times exposed by the control start time management section 32 by reading the configuration file of each control device 21 in advance. According to a predetermined protocol, each control device 21 may notify the communication control unit 20 of the control start time.

In Step S022, the control start time collection section 16 communicates with the control start time management section 32 of each control device 21, and acquires the control start time P. To collect a control start time of each control device 21 into the communication control unit 20, a user of the communication control system may input the control start time into the communication control unit 20 while the communication control system is not operating.

In Step S023, the control start time collection section 16 which has acquired the control start time of each control device 21 records the control start time of each control device 21 on the control start time storage section 17.

Figure 9:
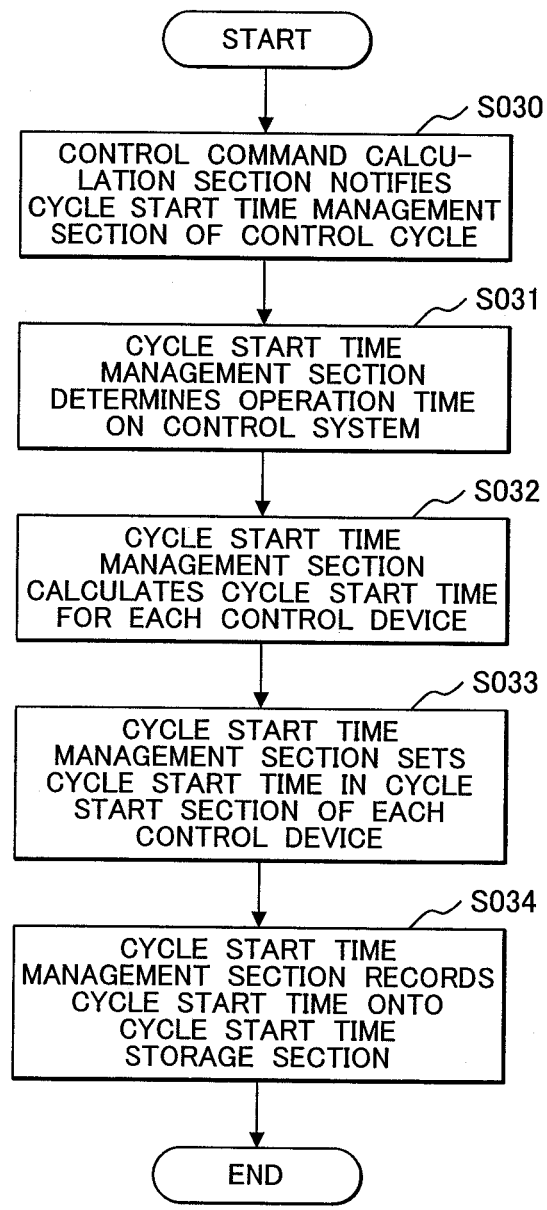
FIG. 9 shows a flowchart showing particular operations of a cycle start time control section.

Next, operation of the cycle start time management section 15 is explained with reference to the flowchart of FIG. 9. This processing shows the details of the processing performed as Step S06 in response to a determination request of the cycle start time in Step S05 of FIG. 5 in the transmission time control section 13.

First, in Step S030, the control command calculation section 12 notifies the cycle start time management section 15 of a control period.

In step S031, the cycle start time management section 15 determines a significant operation time on the communication control system in the time scale synchronized the by synchronization section 14 on the basis of the control period notified from the control command calculation section 12. For example, a time having elapsed from a current time by a predetermined time is determined as the operation time. After the first operation time determined in Step S031, the cycle start time control section 15 sets a time having passed by a period notified by the control command calculation section 12 as a time of a subsequent operation.

Next, in Step S032, the cycle start time management section 15 calculates, for each control device 21, a time obtained by subtracting a control start time of each control device 21 stored in the control start time storage section 17 from an operation time determined in Step S031. This is calculated by Formula (5) when a cycle start time which is an operation start time to be obtained is Tn and n is an identifier of the control device 21.

[Formula 5]

$$Tn = Ta - Pn \qquad (5)$$

Here, Ta is a time to carry out a significant operation on the communication control system, and Pn is a time control start time of each control device 21.

Next, in Step S033, the cycle start time management section 15 sets the computed cycle start time Tn in the cycle start section 33 of each control device 21. This setting includes, for example, notification of the first operation time Tn and a period and notification of each operation start time.

In Step S034, the cycle start time management section 15 records the calculated Tn onto the cycle start time storage section 18.

Figure 10:
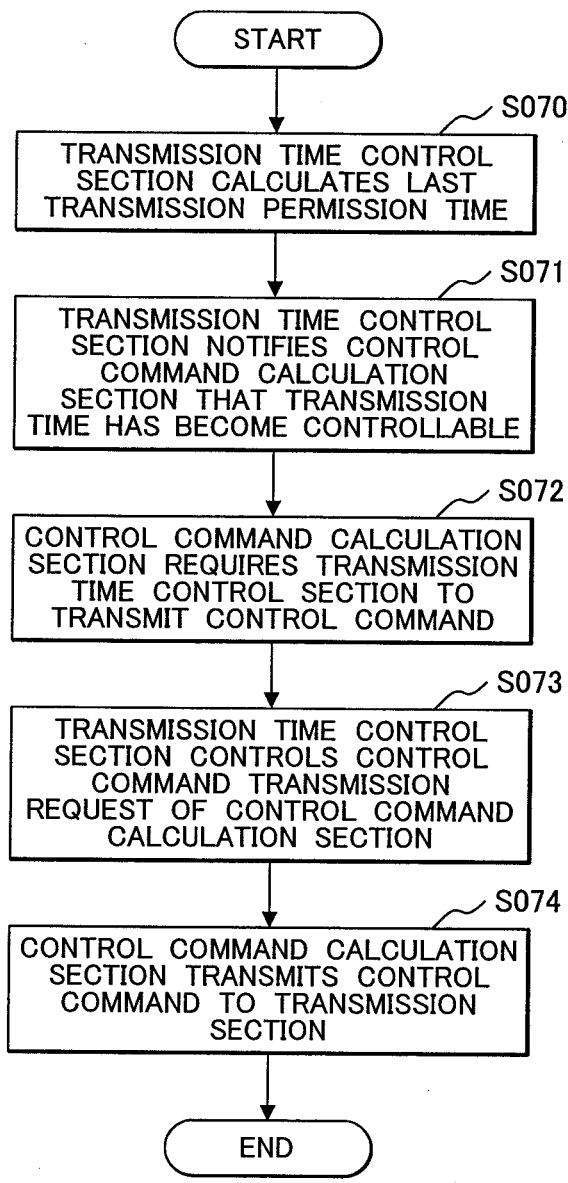
FIG. 10 shows a flowchart showing operations between a transmission time control section and a control command calculation section.

The transmission time control section 13 uses the procedure shown in FIG. 10 after processing of the cycle start time management section 15. That is, in the flow of FIG. 5, at the end of the processing from Step S01 to Step S06 (management and adjustment in the synchronization management section 100), the processing to notify the control command calculation section 12 of the result of this management and adjustment and to reflect the result in the control device 21 is performed in Step S07 and Step S08. Its detail is shown in the flowchart of FIG. 10.

In FIG. 10, first in Step S070, a last transmission permission time is obtained based on the communication delay recorded on the communication delay storage section 19 and the operation start time of each control device 21 recorded on the cycle start time storage section 18. The Tp is calculated by Formula (6) wherein n is an identifier of the control device 21 and the last transmission permission time to be obtained is Tp.

[Formula 6]

$$Tp = \min(Tn - dn) \quad (6)$$

wherein Tn is an operation start time of each control device 21, dn is a communication delay between the communication control unit 20 and each control device 21, and a min calculation is a formula for obtaining the earliest time in the calculation results from each control device 21. Formula (6) obtains the earliest one of times obtained by subtracting a communication delay from an operation start time of each control device 21.

Figure 16:
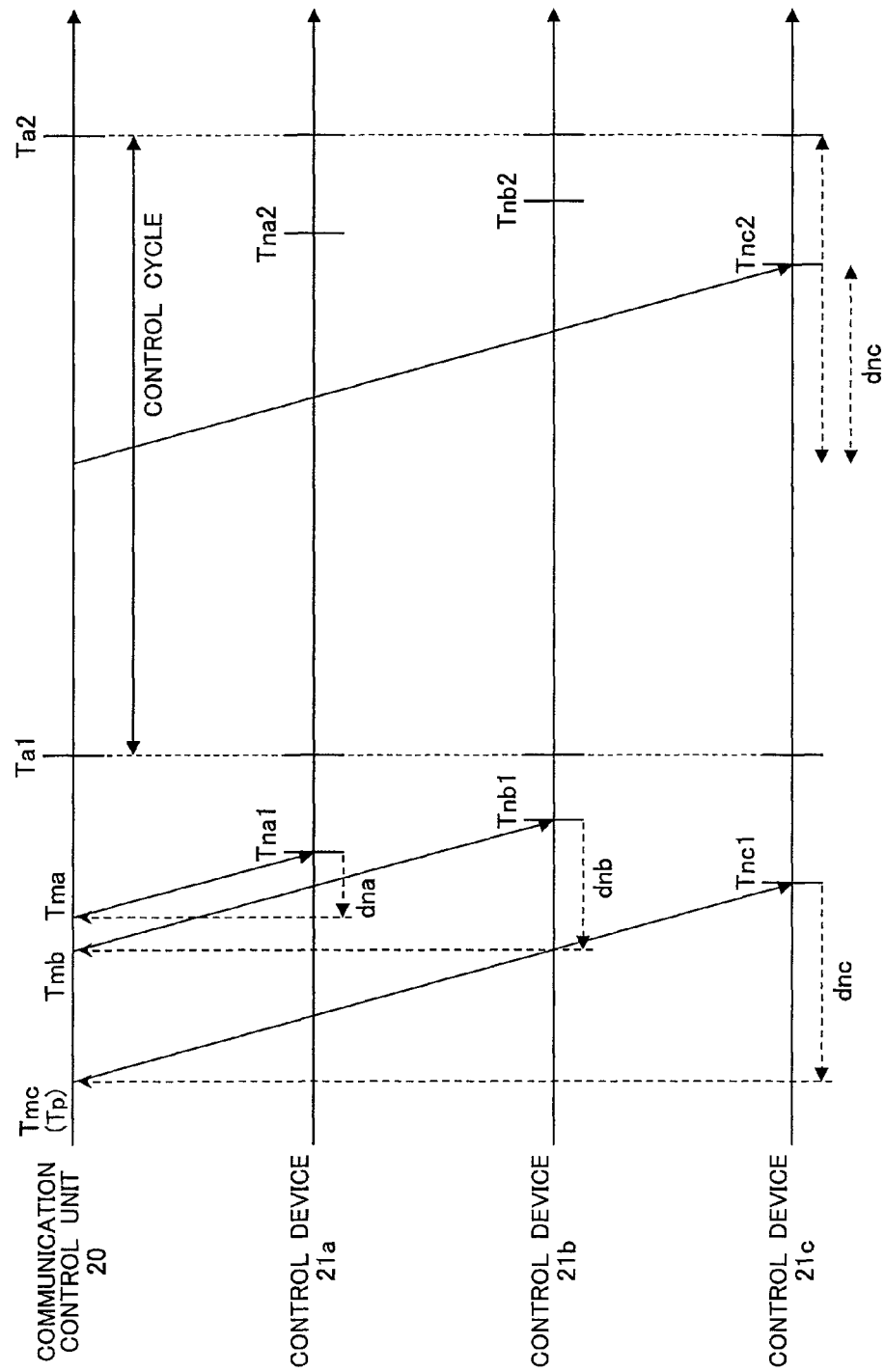
FIG. 16 shows a relationship among a last transmission permission time, an operation start time, and a communication delay dn.
Figure 17:
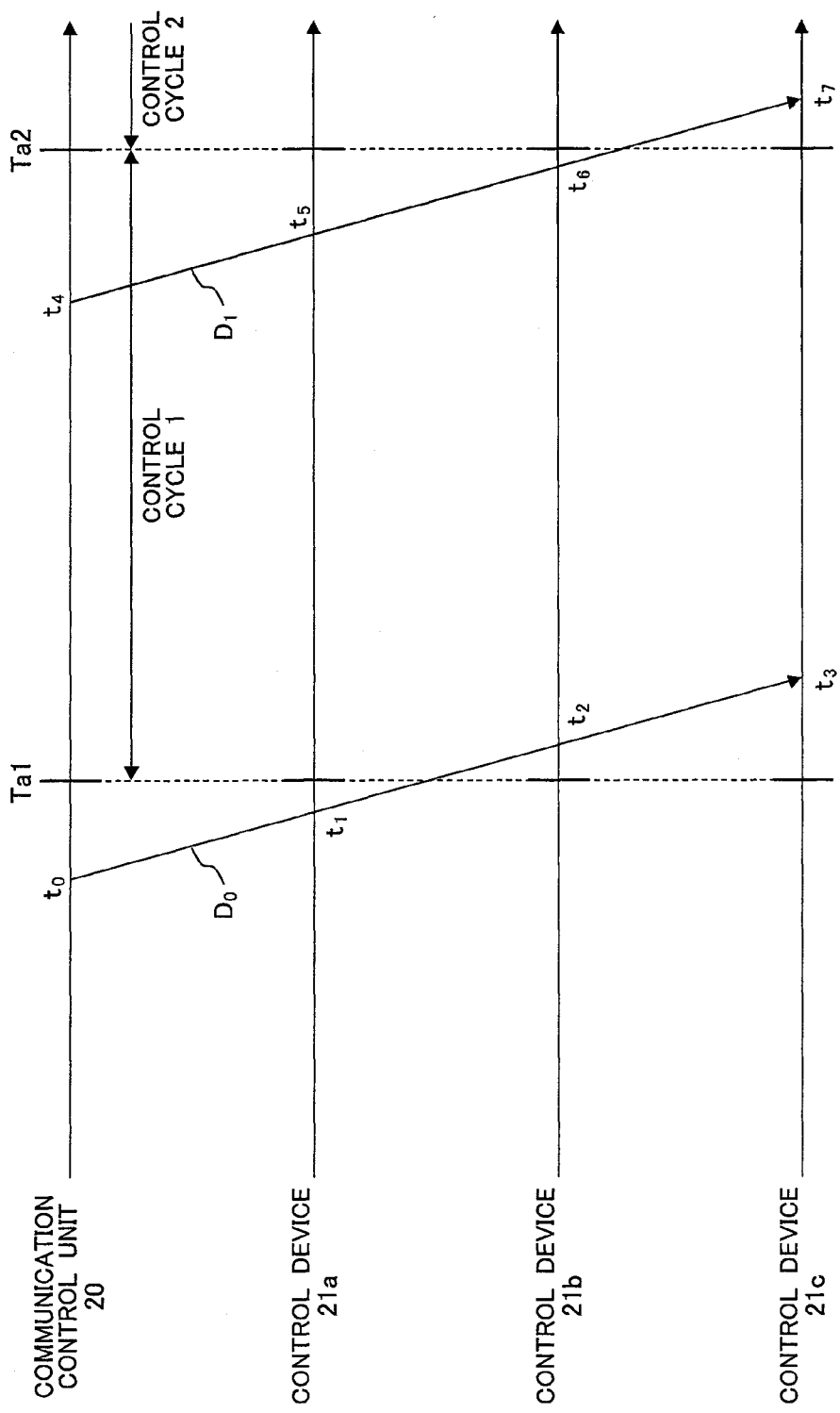
FIG. 17 shows a situation in which a control command D is transmitted from the communication control unit to a control device.

Here, the particular examples of the last transmission permission time Tp, operation start time Tn, and communication delay do are shown in FIG. 16, and the optimum result obtained by the present invention is explained. First, the meanings of signs used here are explained. The Tai shows a significant operation time as the communication control system in a period i, and a suffix i shows the examples of 1 and 2. The Tnji shows an operation start time of j-th control device 21 in the period i, and a suffix j shows examples of three devices, a, b, and c. The dnj shows a communication delay of j-th control device 21. The Tmj shows a time obtained by subtracting a communication delay dnj from an operation start time Tnj1 of j-th control device 21.

In the example of FIG. 16, operation start times of the control devices 21a, 21b, and 21c are supposed to be Tna1, Tnb1, and Tnc1. Communication delays dn of the control devices 21a, 21b, and 21c are supposed to be dna, dnb, and dnc. Thus, when a time is determined by subtracting the communication delay dn from the operation start time Tn, Tma (previous time) is obtained by subtracting the communication delay dna from the operation start time Tna1 in the control device 21a, Tmb (previous time) is obtained by subtracting a communication delay dnb from an operation start time Tnb1 in the control device 21b, and Tmc (previous time) is obtained by subtracting a communication delay dnc from an operation start time Tnc1 in the control device 21b. As a result, in the example of FIG. 16, the earliest one of the times obtained by subtracting the communication delay dn from the operation start time Tn is Tmc, and thus the last transmission permission time Tp is Tmc.

After the last transmission permission time Tp has elapsed, a value obtained by adding a control period of the control command operation section 12 to the last transmission permission time Tp is made to be the last transmission permission time Tp newly, or calculation of Formula (6) may be again performed for the cycle start time updated by the cycle start time management section 15 to update the last transmission permission time Tp.

Next, in Step S071, the transmission time control section 13 notifies the control command calculation section 12 that the control command transmission time can be controlled. In response to this, in step S072, the control command calculation section 12 requires the transmission time control section 13 to transmit a control command.

The transmission time control section 13 permits a control command transmission request of the control command calculation section 12 during from a time of a significant operation up to the last transmission permission time on the communication control system in Step S073. In Step S074, the control command calculation section 12 transmits the control command to the transmission section 10 at a permitted timing.

Figure 20:
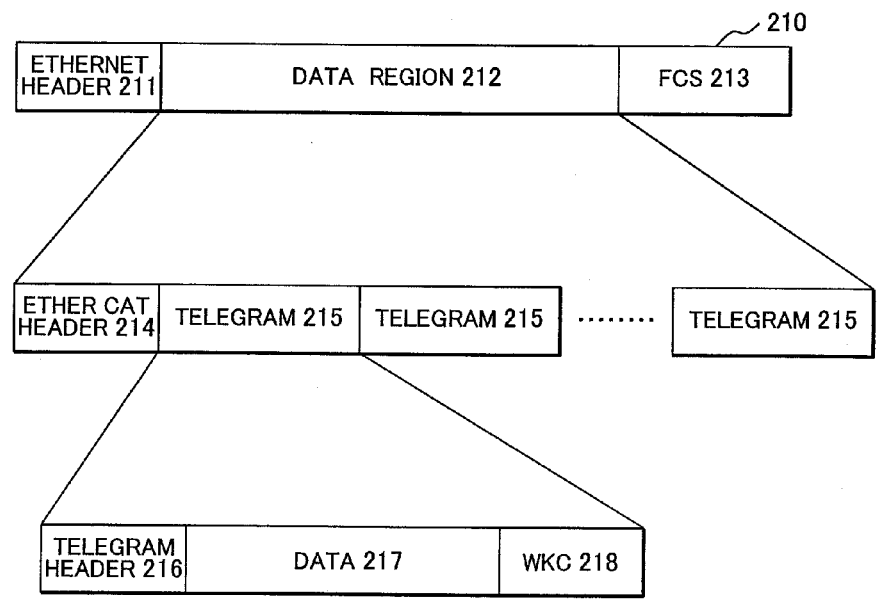
FIG. 20 shows the EtherCAT frame.

In performing a series of above-mentioned processing, the configuration of the EtherCAT frame when configured by the EtherCAT (registered trademark) is shown in FIG. 20.

The Ethernet (registered trademark) frame 210 usually includes: an Ethernet (registered trademark) header 211; a data region 212; and a data check region FCS 213. Contents of communications of EtherCAT are stored in the data region 212 of the Ethernet (registered trademark) frame 210. The Type field of the Ethernet (registered trademark) header 211 in EtherCAT is 0x88A4. The test about whether data is correct is performed using the FCS (Frame Check Sequence) 213.

The data configuration of the EtherCAT (registered trademark) includes: an EtherCAT header 214 and one or multiple EtherCAT telegrams 215. The EtherCAT telegram 215 includes a telegram header 216, telegram data 217, and a working counter 218 (WKC). The working counter 218 is a field counted up by a slave by a predetermined number each time a telegram is correctly processed in the slave in which the telegram is to be processed.

Here, unless the total size of the Ethernet (registered trademark) header 211, data region 212, and FCS 213 exceeds the maximum size of the Ethernet (registered trademark) frame, the control command to each control device 21 is configured as the single or multiple telegrams 215. Therefore, the Ethernet (registered trademark) frame is not transmitted from the communication control unit 20 by the number of the control devices 21 within a certain control period. Each control command to multiple control devices 21 is collected to one Ethernet (registered trademark) frame, if possible.

Therefore, the control period is determined according to the communication delay relative to the control device 21 having the longest communication delay. Specifically, the sum of the control start time and communication delay is calculated for each control device 21, and a value of the largest sum serves as the shortest control period.

Figure 11:
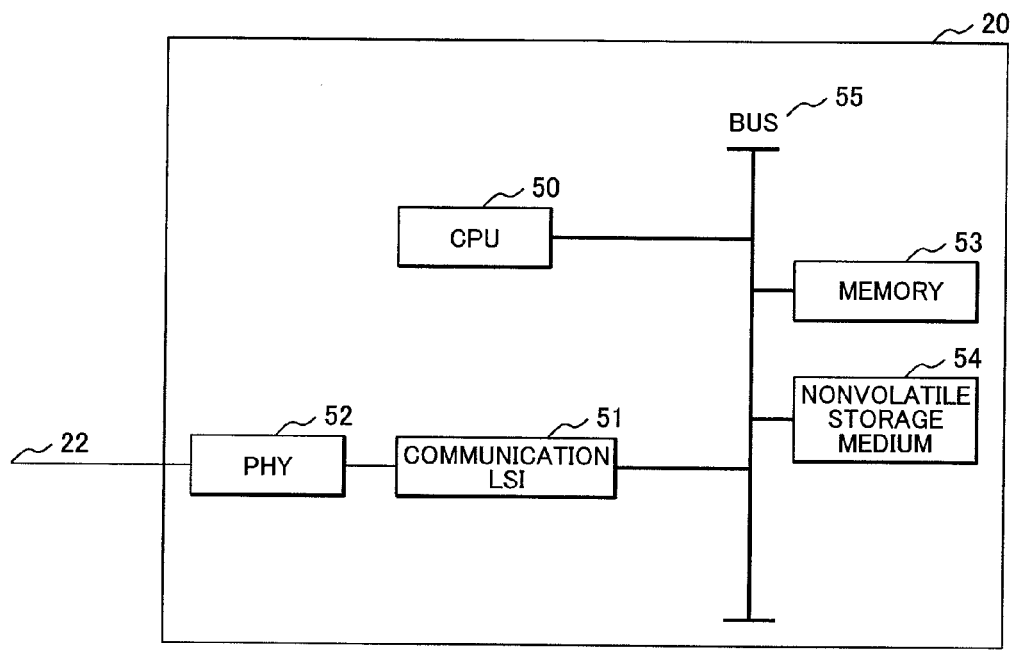
FIG. 11 shows one example of a hardware configuration of the communication control unit.

Next, one embodiment of the hardware configuration of the communication control unit 20 to which the present invention is applied is shown in FIG. 11.

The CPU 50 transmits a program from a nonvolatile storage medium 54 to a memory 53 and executes the program. As the execution program, an OS and an application program which operates on the OS are illustrated.

A communication LSI 51 is equivalent to the transmission time control section 13, synchronization section 14, cycle start time management section 15, control start time collection section 16, communication delay storage section 19, cycle start time storage section 18, and control start time storage section 17 of FIG. 1. The communication delay storage section 19, cycle start time storage section 18, and control start time storage section 17 may be realized by the memory 53 or nonvolatile medium 54. The synchronization section 14, cycle start time management section 15, and control start time collection section 16 may be configured as software operating on the CPU 50 or may have roles separated to software applications operating on the communication LSI 51 and CPU 50. For example, in the operation of the synchronization section 14 shown in FIG. 7, the procedure from Step S010 to Step S019 is performed as software, and Step S020 is performed by the communication LSI 51.

The communication LSI 51 receives a communication request from a program which operates on the CPU 50, and communicates with the network 22 by use of a physical layer (PHY) 52. As an example of mounting of the communication LSI 51, an IC such as FPGA (Field Programmable gate array), CPLD (Complex Programmable logic device), ASIC (Application Specific Integrated Circuit), and a gate array is illustrated.

The physical layer (PHY) 52 is a transceiver IC mounting the communication function with the control network 22. A PHY (physical layer) chip of the Ethernet (registered trademark) is illustrated as a telecommunications standard provided by the physical layer (PHY) 52. In the configuration of FIG. 11, since the communication LSI 51 is connected with the physical layer (PHY) 52, processing of the MAC (Media Access Control) layer of the Ethernet (registered trademark) is contained in the communication LSI 51. However, the present invention is effective also in the configuration for arranging an IC providing an MAC function between the communication LSI 51 and physical layer (PHY) 52 and in the configuration for connecting a communication IC in which an IC providing an MAC function and the physical layer (PHY) 52 are combined and the communication LSI 51.

In the configuration of FIG. 11, since the physical layer (PHY) 52 is outside the communication LSI 51, a processing section of the communication LSI 51 corresponding to the MAC layer corresponds to the communication section 24 of FIG. 1. However, the communication LSI 51 may be an Ethernet (registered trademark) communication device including a MAC layer and a PHY layer, and a PHY function also may be contained in the communication LSI 51.

The memory 53 is a temporary storage region in which the CPU 50 operates, and an OS, an application program, etc. transmitted from the nonvolatile storage medium 54 are stored in the region. The memory 53 has functions of the communication delay storage section 19, cycle start time storage section 18, and control start time storage section 17 by configuration.

The nonvolatile storage medium 54 is a storage medium for information, and is used for storing a program for operating the CPU 50 and execution results of a program. The nonvolatile storage medium 54 has functions of the communication delay storage section 19, cycle start time storage section 18, and control start time storage section 17 by configuration.

A bus 55 connects the CPU 50, memory 53, nonvolatile storage medium 54, and communication LSI 51. As the bus 55, a PCI (registered trademark) bus, an ISA bus, a PCI Express (registered trademark) bus, a system bus, a memory bus, etc. are illustrated.

Figure 12:
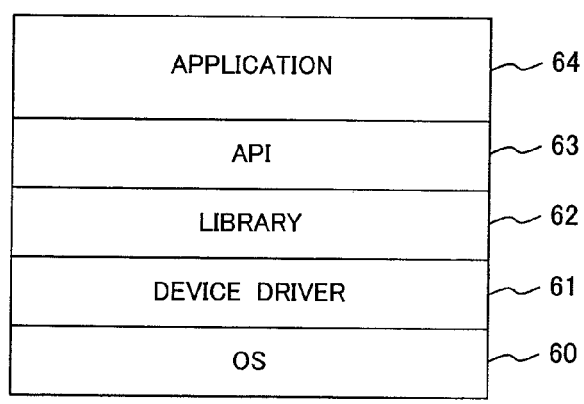
FIG. 12 shows one example of a software configuration operating on a CPU.

Next, the software configuration of the present invention including the software configuration which operates on the CPU 50 is shown in FIG. 12.

An OS 60 provides basic functions such as program management and access to hardware. The OS 60 is not necessarily required but is preferably used because it provides basic functions such as use of general-purpose applications and existing software and task management. A real-time OS in which task scheduling is executable is preferable according to temporal constraints.

A device driver 61 provides a function for accessing a data region, operation management information, and state information released by the communication LSI 51 via the bus 55 by use of an access technique to hardware provided by the OS 60. The device driver 61 may be part of the OS 60.

A library 62 groups frequently used functions and provides basic functions such as memory management, task management, inputs/outputs, and a file manipulation by use of the function of OS 60. As a particular example, glibc used in Linux (registered trademark) is mentioned.

An API 63 is a software interface for using functions provided by the device driver 61 and OS 60 via the library 62.

An application 64 is software for calculating a control command value to control the control target 21, and performs transmission and reception of communication packets by use of the communication LSI 51.

The application 64 is equivalent to the control command calculation section 12 of FIG. 1. In Step S071 of FIG. 10, for the transmission time control section 13 to notify the control command calculation section 12 that a transmission time has become controllable, interruption may be used or the notification may be shown to a predetermined register of the communication LSI 51. An instruction to start the operation of the transmission time control section 13 may be made by the application 64 by use of a predetermined API 63. For the control command calculation section 12 to request the transmission time control section 13 to transmit a control command in Step S072, a way to transfer the control command from the application 64 to the communication LSI 51 is illustrated. The synchronization section 14, cycle start time management section 15, and control start time collection section 16 may be configured as the application 64.

The advantageous effect of the above invention is explained. The control start time management section 32 collects control start times of the control devices 21. The cycle start time management section 15 sets, to each control device 21, a time obtained by subtracting a control start time of each control device 21 from an operation time of a target communication control system. Thus, each control device 21 can synchronize the operation time of the communication control system.

The communication control unit 20 determines the last transmission permission time in consideration of the cycle start time determined by the cycle start time management section 15 and the communication delay measured by the synchronization section 14. Thus, all the control devices 21 can receive the control command of the control command calculation section 12 within the same period.

In the present invention, since the communication control unit 20 transmits a control command to each control device 21 on the network 22 where the synchronization has been made, the control period can be shortened, unlike in the time division multiple access method in which the communication control unit 20 divides a communication time for each control device 21. The control performance of the communication control system can be improved by shortening the control period.

Embodiment 2

In the embodiment 1, the realization using EtherCAT (registered trademark) is explained. The same realization also is possible by IEEE 1588. In this case, the configuration is made using IEEE1588 in the synchronization system of the synchronization section 14 of FIG. 1. Unless otherwise stated, the same functions and components as above are indicated by similar reference numerals in the following explanation.

Figure 13:
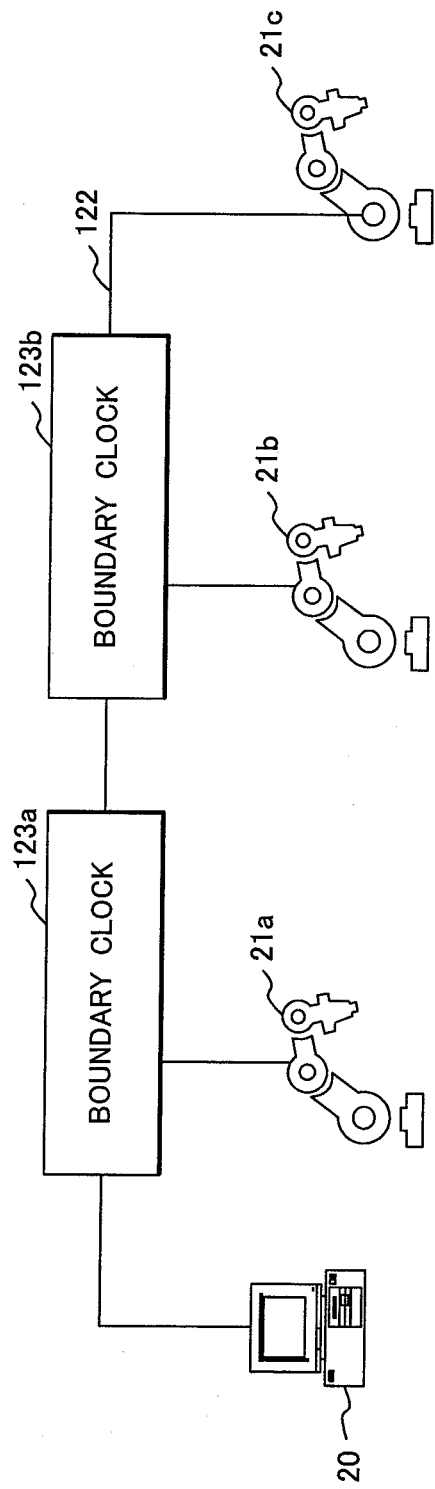
FIG. 13 shows one example of a system implemented by IEEE 1588.

The example of a system using the communication control unit 20 in this case is shown in FIG. 13. A boundary clock 123 is a network device including a synchronization function defined by IEEE1588. The boundary clock 123 is provided with multiple ports, and can synchronize with multiple communication peers.

The functional configuration of the communication control unit 20 to which the present invention is applied is the same as that of FIG. 1. The hardware configuration of the communication control unit 20 is the same as that of FIG. 11. The software configuration which operates on the CPU 50 is the same as that of FIG. 12.

Figure 14:
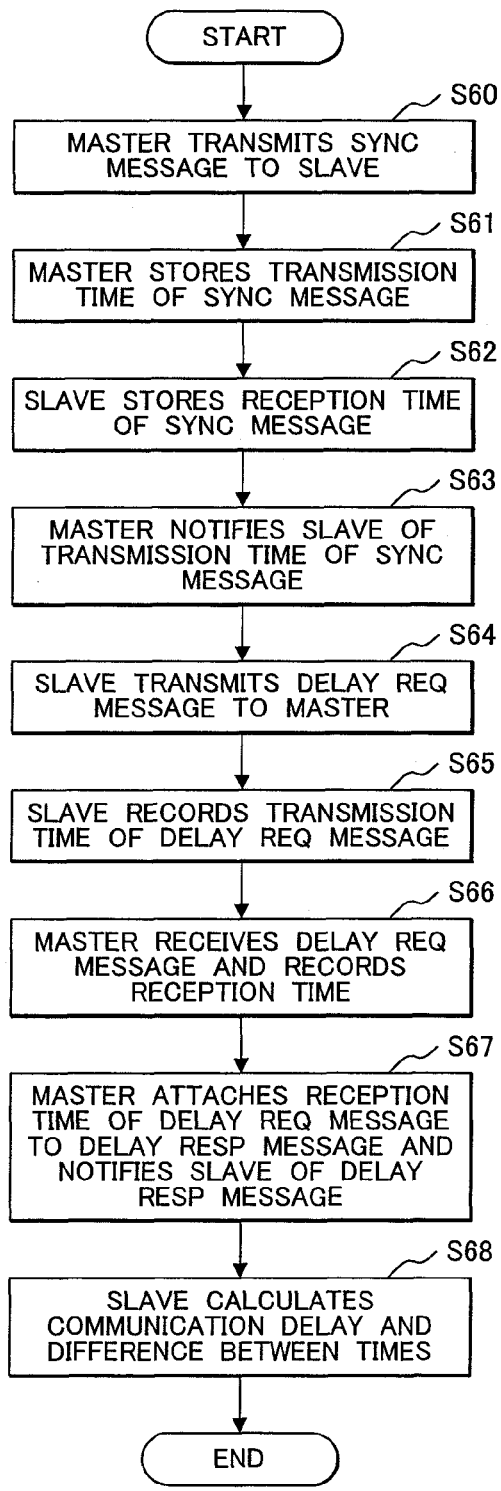
FIG. 14 shows a procedure of synchronization by IEEE 1588.
Figure 15:
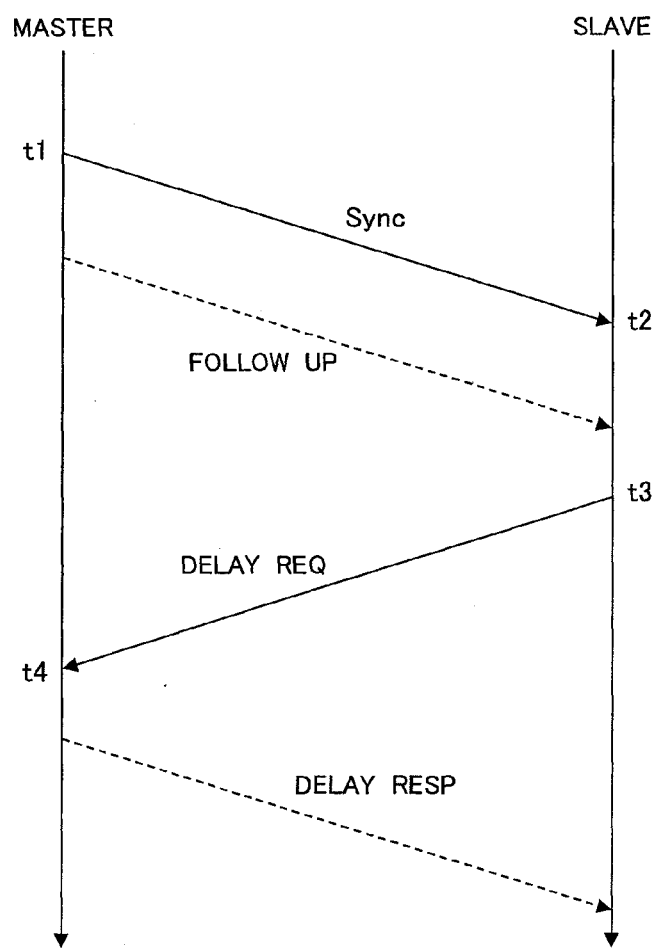
FIG. 15 shows synchronization messages of IEEE 1588.

The procedure of realizing the synchronization section 14 of FIG. 1 by use of a synchronization protocol of IEEE1588 is shown in FIG. 14. The exchange of messages in IEEE1588 is shown in FIG. 15.

IEEE 1588 uses a master-slave configuration. In FIG. 15, an action of the master is shown in the left side, an action of the slave is shown in the right side, and a time axis is shown in the vertical direction.

This synchronization protocol starts from the master first and transmits a Sync message to the slave in Step S60. At this time, the master records a transmission time t1 of the Sync message (Step S61).

The slave records a reception time t2 when receiving the Sync message in step S62.

In Step S63, the master notifies the slave of the transmission time t1 of the Sync message by use of one of the following techniques. One is to attach information about t1 to the Sync message. The other one is to attach information about t1 to the Follow Up message following the Sync message.

The slave transmits a Delay Req message to the master in Step S64 after reception of the Follow Up message following the Sync message. At this time, the slave records a transmission time t3 of the Delay Req message (Step S65).

When the master receives the Delay Req message in Step S66, a reception time t4 is recorded. Then, the master attaches information about t4 to the Delay Resp message, and notifies the slave of t4 (Step S67).

In Step S68, the slave which has received the Delay Resp message calculates a communication delay and a time difference between the master and slave from each time t1, t2, t3, and t4.

The calculation of the communication delay is based on the premise that the communication delay between the master and slave does not change between outward and return paths. Therefore, the calculation of a one-way communication delay td is expressed by Formula (7).

[Formula 7]

$$td = ((t4-t3)+(t2-t1))/2 \quad (7)$$

The difference tdiff between times of the master and slave is expressed by Formula (8). By use of this tdiff, the master and slave is synchronized.

[Formula 8]

$$tdiff = \{(t4-t3)-(t2-t1)\}/2 \quad (8)$$

In the configuration of FIG. 13, the procedure of FIG. 14 is performed and the synchronization is performed between the communication control unit 20 and boundary clock 123. The boundary clock 123 may be either the master or slave depending on a communication port.

The case in which the communication control unit 20 is a grand master is explained in the configuration of FIG. 13. The grand master in IEEE 1588 is a device having a clock used as a final reference of synchronization. The communication control unit 20 serves as a master and the boundary clock 123a serves as a slave to execute synchronization. After that, the boundary clock 123a serves as a master and a control device 21a and boundary clock 123b serve as slaves respectively. Then, the boundary clock 123b serves as a master and the control device 21b and control device 21c serve as slaves to execute synchronization in the entire system.

The synchronization section 14 acquires a communication delay from each control device 21 after the entire communication control system synchronizes the times. In this acquisition, for example, a configuration file is defined for each control device 21 in advance, a region accessible by the communication control unit 20 is defined in the file, and the synchronization section 14 of each control device 21 exposes the communication delay in that region. For example, returning a communication delay in response to connection with a predetermined port number by UDP communication can be considered. The communication control unit 20 can be aware of the communication delay exposed by the synchronization section 14 by reading the configuration file for each control device 21 in advance. Alternatively, according to a predetermined protocol, each control device 21 may notify the communication control unit 20 of the communication delay.

However, as shown in FIG. 13, in the network topology using the boundary clock 123 or switch, it may be necessary to calculate a communication delay according to the topology. In the boundary clock, a communication delay is measured only in one link. Therefore, in connection with another control device 21 from the communication control unit 20 via the boundary clock 123, it may be necessary to add a communication delay of each link. For example, in FIG. 13, to obtain a communication delay from the communication control unit 20 until the control device 21a, the sum of a delay from the communication control unit 20 until the boundary clock 123a and a delay from boundary clock 123a until the control device 21a may need to be calculated.

However, a communication delay within the boundary clock is not taken into consideration in this case. Therefore, to obtain a more precise communication delay, it is preferable to use end-to-end TC (Transparent Clock) defined by IEEE 1588 or peer-to-peer TC (Transparent Clock). These clocks are equipped with a configuration for measuring a transfer delay of a packet within a device.

The synchronization section 14 records a communication delay of each control device 21 onto the communication delay storage section 19 when acquiring the communication delay.

In the configuration shown in FIG. 13, the control command calculation section 12 transmits a control command by a broadcasting communication or multicast communication. At this time, for each control device 21 to identify a control command for itself, a format of a communication frame may need to be defined within the communication control system. One example is shown in FIG. 21.

Figure 21:
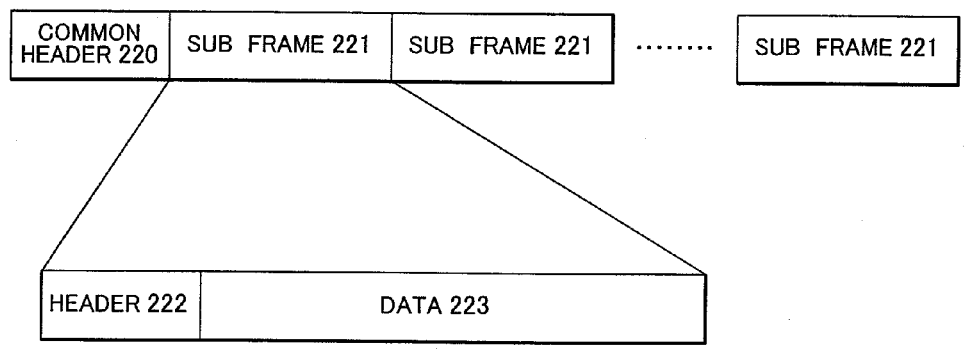
FIG. 21 shows a format of a communication frame for control command identification.

In FIG. 21, a common header 220 includes management information about the entire frame. For example, the management information includes the number of sub frames and the sum of data lengths. A control command for each control device 21 is configured as a sub frame 221. The sub frame 221 includes a header 222 and data 223. Examples of configuration by the sub frame 221 include a technique for arranging the sub-frames 221 for the respective control devices 21 ordered under a predetermined rule and a technique for arranging the sub frames 221 in an arbitrary order and containing an identifier of each control device 21 in the header 222. A configuration for making a data length of the data 223 constant or variable is illustrated. When the data length is variable, information about the data length is contained in the header 222.

Alternatively, also a technique for notification of a control command by the control command calculation section 12 by a unicast communication in which a single communication frame is transmitted to each control device 21 instead of broadcast communication or multicast communication can be considered. In this case, a wait time until the start of transmission of a control command to each control device 21 is contained in a communication delay relative to each control device 21 stored in the communication delay storage section 19. The transmission time control section 13 adjusts this wait time so that it may be constant.

The advantageous effectiveness of the above invention is explained. The control start time management section 32 collects a control start time of each control device 21. The cycle start time management section 15 sets, in each control device 21, a time obtained by subtracting a control start time of a target communication control system from an operation time of the system. Thus, each control device 21 can synchronize the operation time of the communication control system.

The communication control unit 20 determines a last transmission permission time in consideration of a cycle start time determined by the cycle start time management section 15 and a communication delay measured by the synchronization section 14. Thus, all the control devices 21 can receive a control command of the control command calculation section 12 in the same period.

In the present invention, since the communication control unit 20 transmits a control command to each control device 21 on the network 22 where the synchronization has been done, a control period can be shortened, unlike in the time division multiple access method in which the communication control unit 20 divides a communication time for each control device 21. When a control period can be shortened, the controlling performance of a communication control system can be improved.

Embodiment 3

Next, the artifice in a sensor value reception in the control device 21 is explained. Unless otherwise stated, the same functions and components as above are indicated by similar reference numerals in the following explanation.

The example of the system configuration in this case is the same as that of FIG. 3 and FIG. 4. The hardware configuration of the communication control unit 20 is the same as that of FIG. 11. The software configuration which operates on the CPU 50 is the same as that of FIG. 12.

Figure 22:
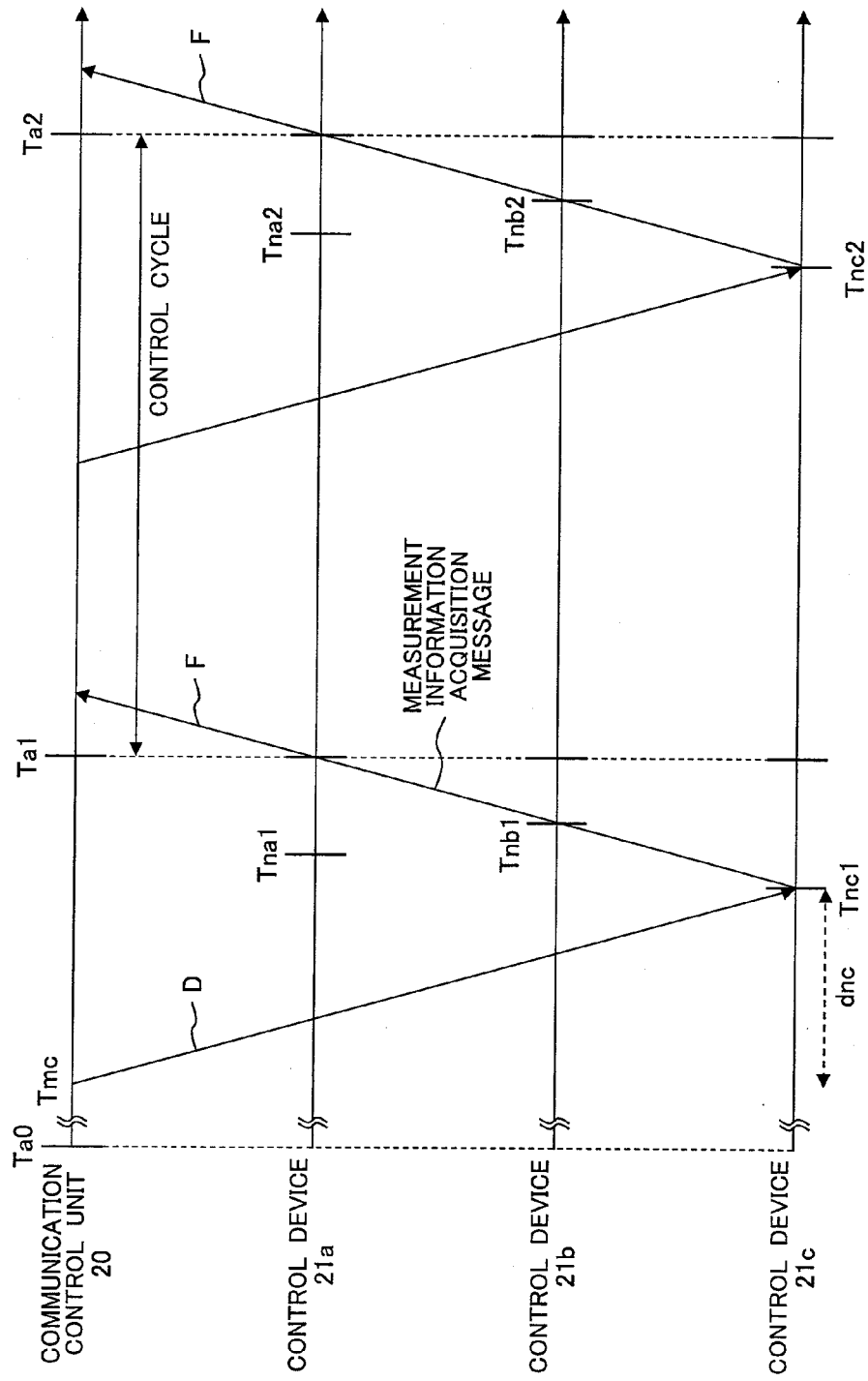
FIG. 22 shows one example of measurement information acquisition by the control device without time restriction.

As shown in FIG. 22, in acquisition of measurement information about the control device 21, a technique for attaching measurement information to a transmission message F for the control command D can be considered. Here, Tan is a time at which measurement information in cycle n is updated. In this case, measurement information used in calculation of a control command for an operation time Ta2 of the communication control system is not information at or after an operation time Ta1 but measurement information at an operation time Ta0 in a previous cycle. Therefore, the control command for Ta2 is a calculation value using the measurement information that is one cycle older.

Here, operations of the present invention for calculating a control command based on measurement information within the same control period is explained. To calculate a control command based on measurement information within the same control period, both the communication control unit 20 and control device 21 may need to be improved.

Figure 24:
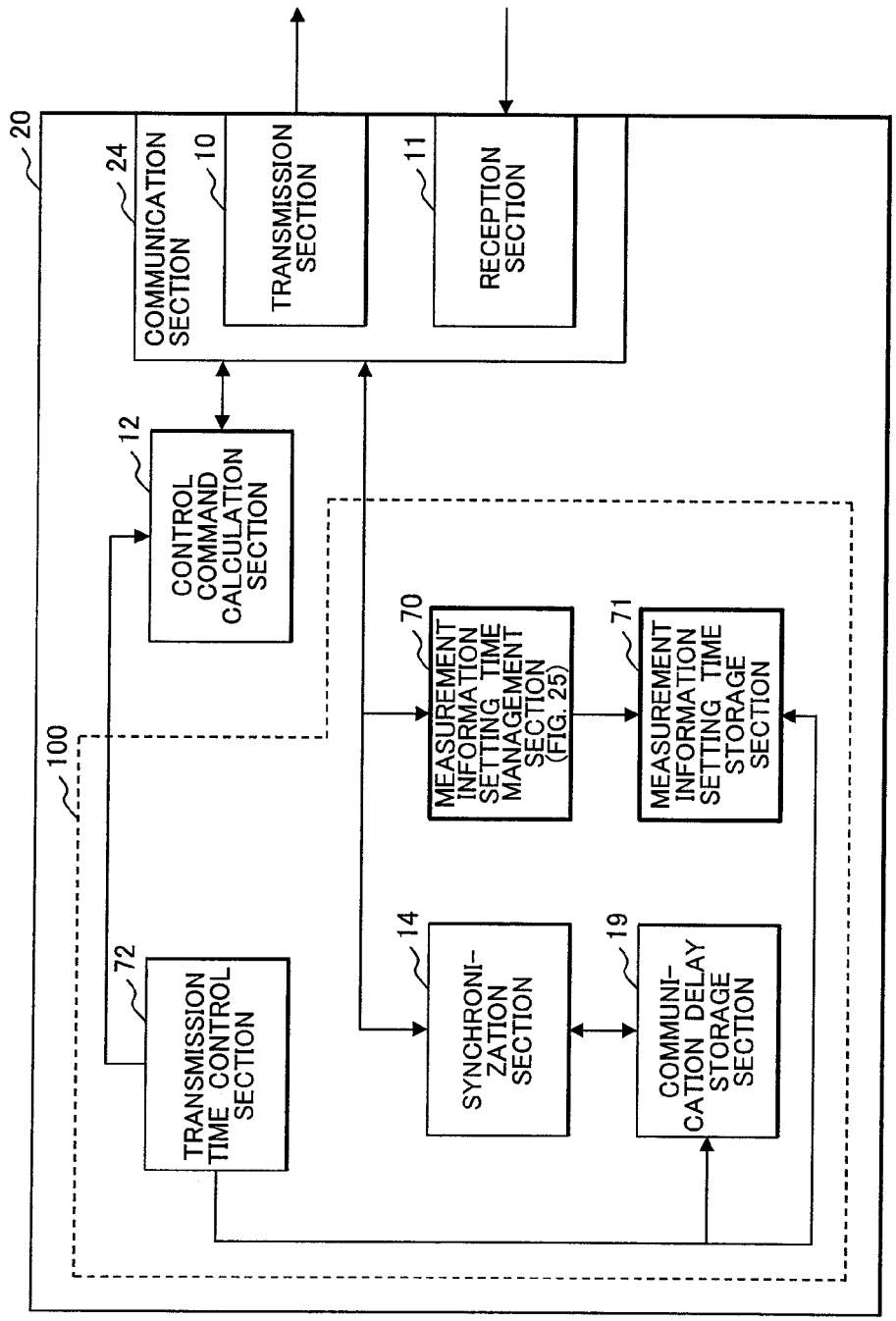
FIG. 24 shows a functional configuration of the communication control unit for performing measurement and control within the same cycle.

The functional configuration of communication control unit 20 improved in such a viewpoint is shown in FIG. 24. In comparison to the functional configuration of FIG. 1, the functional configuration of FIG. 24 newly includes a measurement information setting time management section 70 and measurement information setting time storage section 71. Although not shown to FIG. 24, the configuration may include the cycle start time management section 15, cycle start time storage section 18, control start time collection section 16, and control start time storage section 17.

Here, the measurement information setting time management section 70 collects a measurement information setting time of each control device 21 and registers collected measurement information setting times into the measurement information setting time storage section 71.

The measurement information setting time storage section 71 stores the measurement information setting times collected by the measurement information setting time management section 70.

A transmission time control section 72 controls a transmission time of a measurement information acquisition message of the control command calculation section 12 in consideration of the measurement information setting time.

Figure 26:
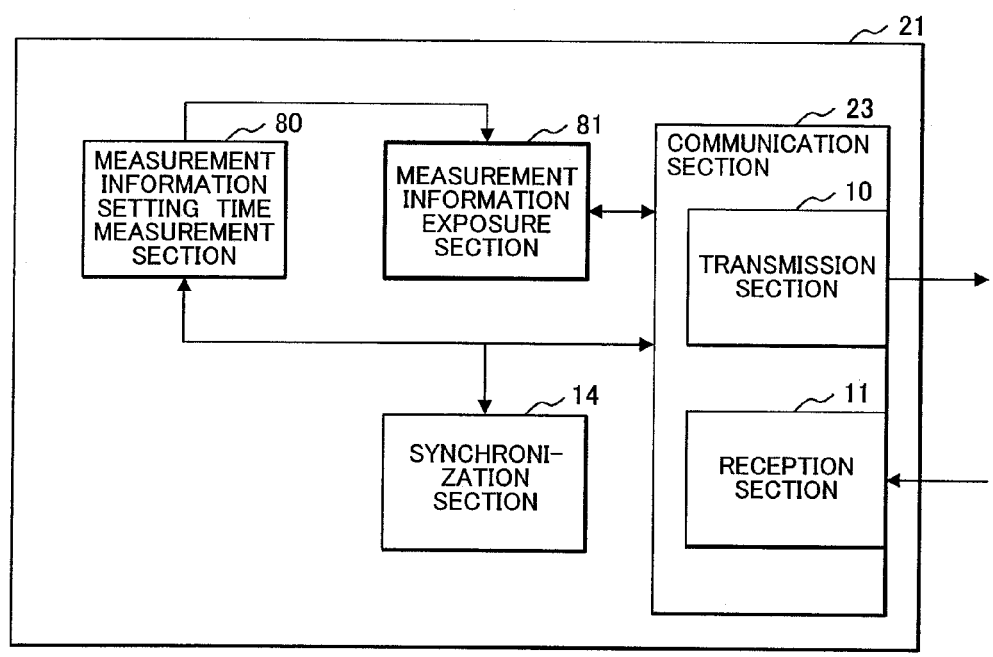
FIG. 26 shows a functional configuration of the control device for performing measurement and control within the same cycle.

One embodiment of the functional configuration of the control device 21 improved corresponding to the improvement of the communication control unit 20 is shown in FIG. 26. The control device 21 of FIG. 26 includes a measurement information exposure section 81 and exposes measurement information about a sensor (not shown) etc. of the control device 21 to the outside.

A measurement information setting time measurement section 80 acquires a measurement information setting time from execution of a significant operation on the communication control system until setting of measurement information in the measurement information exposure section 81 of the control device 21, and exposes the acquired time to the communication control unit 20. The measurement information setting time is a time from execution of a significant operation on the communication control system until setting of measurement information in the measurement information exposure section 81 of the control device 21 in a time scale synchronized by the synchronization section 14. The "significant operation" herein is, e.g., acquisition of measurement information by the sensor provided to the control device 21.

Figure 25:
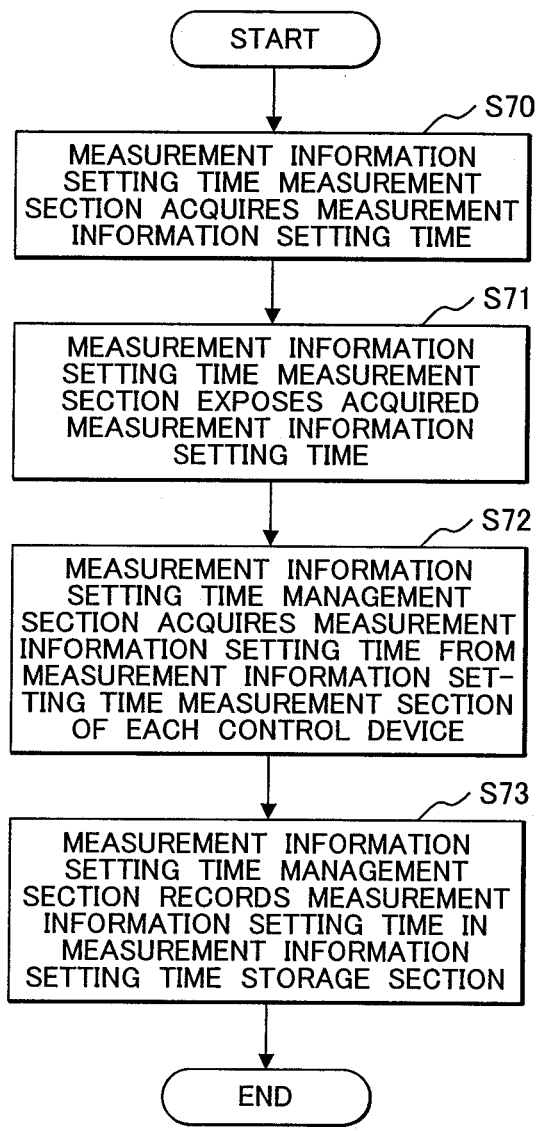
FIG. 25 shows a procedure of collecting the measurement information setting time of each control device.

The procedure in which the measurement information setting time management section 70 collects a measurement information setting time of each control device 21 is explained in reference to FIG. 25.

In step S70 of FIG. 25, a measurement information setting time is acquired by the measurement information setting time measurement section 80 of each control device 21 before the device starts. This measurement information setting time may be a value set by a developer of the control device 21, or a way for measuring a measurement information setting time may be provided to the control device 21 to measure the time. Such a measurement may include a way using a CPU or a microcomputer or a way using the synchronization section 14 which allows for output and input of interruption.

For example, the synchronization section 14 outputs interruption at the instant that the control device 21 carries out a significant operation, and at this instant, a timer is activated. Then, when the timer is stopped at the instant that measurement information is set in the measurement information exposure section 81, the measurement information setting time can be acquired. In the initial stage before starting the communication control system, this acquisition is repeated predetermined times and its average value can also be set as the measurement information setting time.

In the present invention, it is preferable for the measurement information setting time to be constant. Therefore, when the measurement information setting time changes, it may need to be constant. To make constant the measurement information setting time, the measurement information exposure section 81 may wait using a timer function.

The above response in Step S70 of FIG. 25 is performed in the preparation before the device operates. Alternatively, the measurement information setting time measurement section 80 may acquire a measurement information setting time at an arbitrary timing when the device operates.

Next, the measurement information setting time measurement section 80 of each control device 21 exposes the acquired measurement information setting time to the communication control unit 20 in Step S71. As an example in this exposure, a developer of the control device 21 defines a configuration file for each control device 21 in advance, a region accessible by the communication control unit 20 is defined in the file, and the measurement information setting time measurement section 80 of each control device 21 exposes a control start time in that region. For example, returning a measurement information setting time in response to connection with a predetermined port number by UDP communication can be considered. The communication control unit 20 can be aware of the region of the measurement information setting time exposed by the measurement information setting time measurement section 80 by reading the configuration file of each control device 21 in advance. Alternatively, according to a predetermined protocol, each control device 21 may notify the communication control unit 20 of the measurement information setting time.

In Step S72, the measurement information setting time management section 70 communicates with the measurement information setting time measurement section 80 of each control device 21 to acquire the measurement information setting time. The user of the communication control system may input the way of collecting the measurement information setting time of each control device 21 into the communication control unit 20 while the communication control system is not operated.

In Step S73, the measurement information setting time management section 70 which has acquired the measurement information setting time of each control device 21 records the measurement information setting time for each control device 21 onto the measurement information setting time storage section 71.

The transmission time control section 72 acquires a transmission start permission time based on the above information. Here, when the transmission start permission time to be acquired is set to Tps while n is an identifier of the control device 21, Tps is calculated by Formula (9).

[Formula 9]

$$Tps = \max(Ts - dn) \tag{9}$$

In this Formula, Ts is a time at which the measurement information setting time of each control device 21 has elapsed since a significant operation time in the communication control system, dn is a communication delay between the communication control unit 20 and each control device 21, and max calculation obtains the latest time from calculation results for each control device 21. Formula (9) obtains the latest one of times each obtained by subtracting a communication delay from the time at which the measurement information exposure section 81 updates measurement information in each control device 21.

Figure 23:
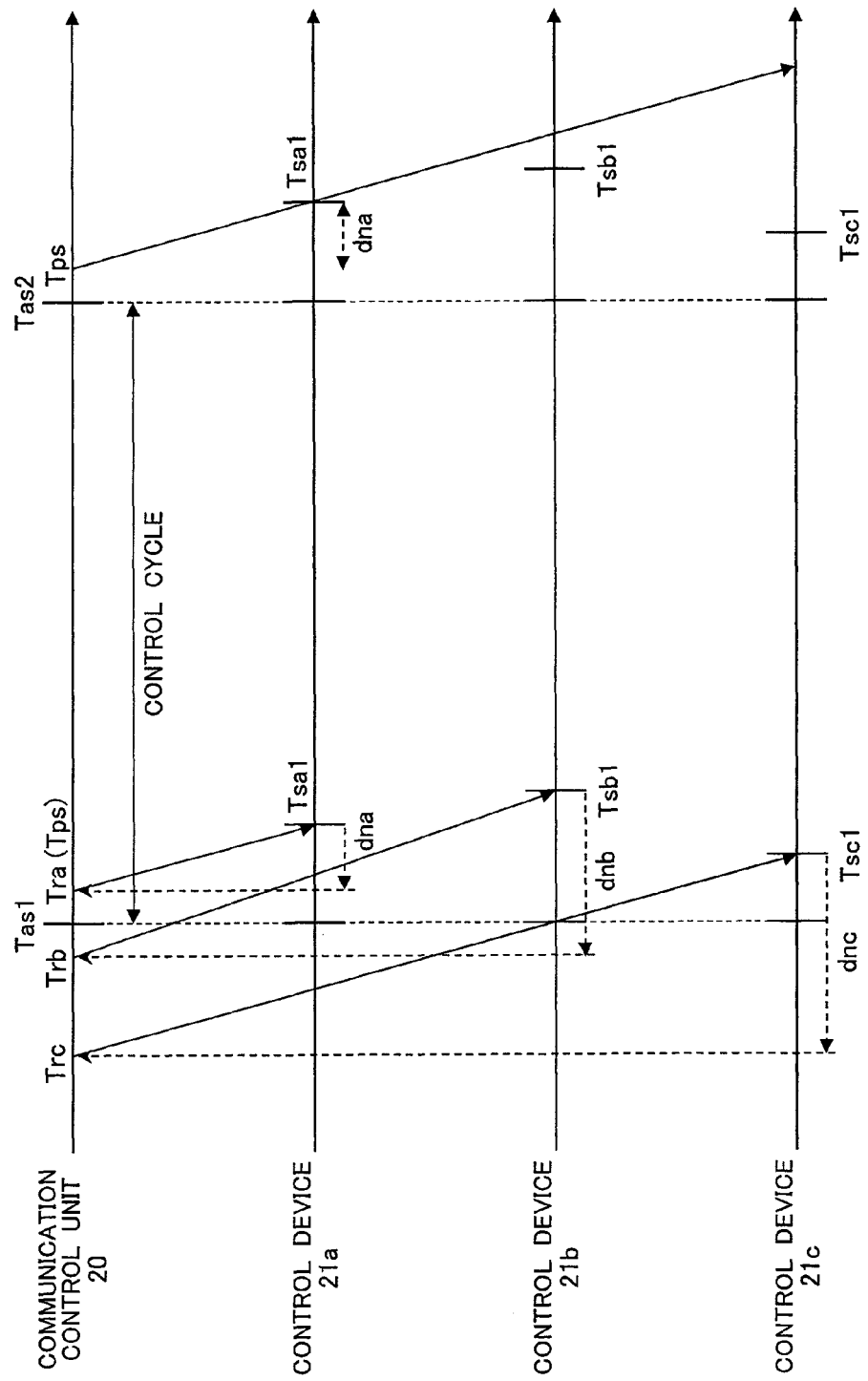
FIG. 23 shows a relationship between a transmission start permission time, a measurement information setting time, and a communication delay.

The particular example of the transmission start permission time, the time at which the measurement information is set in the measurement information exposure section 81, and the communication delay is shown in FIG. 23. When the signs herein are explained, Tasi shows a significant operation time in the communication control system in a period i, and a suffix i shows the examples of 1 and 2. The Tsji shows a time at which the measurement information about j-th control device 21 in the period i is set in the measurement information exposure section 81, and a suffix j shows three devices a, b, and c. The dnj is a communication delay of j-th control device 21, and Trj is a time obtained by subtracting dnj from Tsj1 of j-th control device 21.

In the example of FIG. 23, times when measurement information about the control devices 21a, 21b, and 21c is set in the measurement information exposure section 81 are Tsa1, Tsb1, and Tsc1. Communication delays dn of the control devices 21a, 21b, and 21c are dna, dnb, and dnc. Thus, a time obtained by subtracting the communication delay dn from the time Tsj1 when the measurement information is set in the measurement information exposure section 81 is Tra (previous time) obtained by subtracting the communication delay dna from the operation start time Tsa1 in the control device 21a, Trb (previous time) obtained by subtracting the communication delay dnb from the operation start time Tsb1 in the control device 21b, and Trc (previous time) obtained by subtracting the communication delay dnc from the operation start time Tsc1 in the control device 21c. As a result, in the example of this FIG. 23, Tra is the latest of the times obtained by subtracting the communication delay dn from the time Tn at which measurement information is set in the measurement information exposure section 81, and the transmission start permission time Tps is Tra.

After Tps has elapsed, a value obtained by adding a control period of the control command calculation section 12 to Tps may be newly set as Tps, or Formula (9) may be performed again to update Tps.

The transmission time control section 72 permits transmission of a measurement information acquisition message of the control command calculation section 12 at or after Tps. A transmission end time within the same control period is examined. Restriction of the transmission end time is to provide notification of a measurement information acquisition message before a time at which measurement information is updated earliest. When the transmission end time is Tpl, Tpl is calculated by the following formula.

[Formula 10]

$$Tpl = \min(Ts - dn) \tag{10}$$

Therefore, the transmission time control section 72 may need to transmit a measurement information acquisition message at or after Tps and at or before Tpl.

Figure 27:
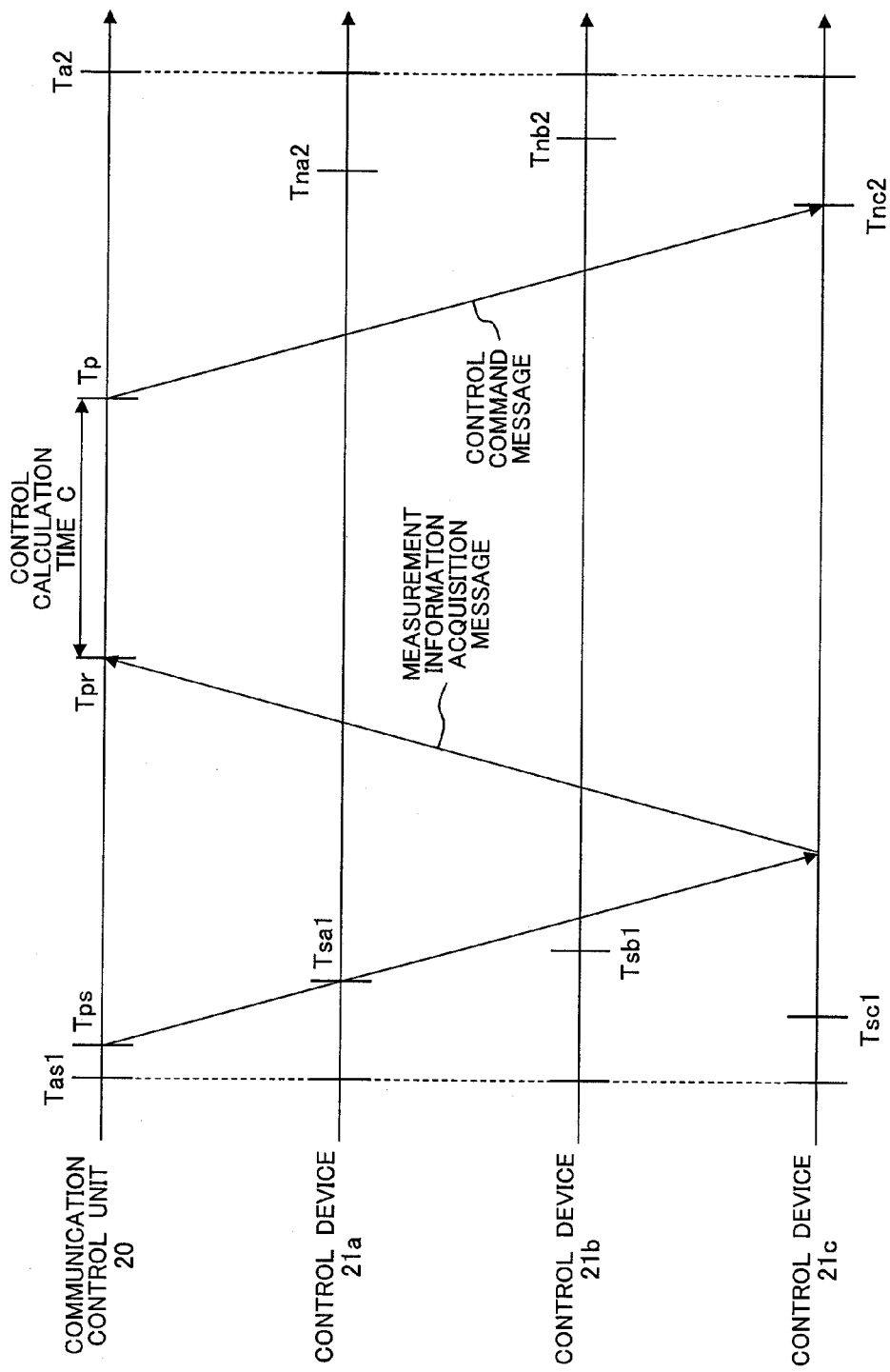
FIG. 27 shows a time relationship when measurement and control are performed within the same cycle.

The relationship between the transmission time of the measurement information acquisition message of the control command calculation section 12 using the present invention and the transmission time of the control command message is shown in FIG. 27. The Tpr is a reception time of the measurement information acquisition message in the communication control unit 20. The control command calculation section 12 transmits a measurement information acquisition message at or after Tps, and performs a control calculation based on the received data, and transmits a control command message by the earlier time of Tp and Tpl. Accordingly, a command value can be calculated from the measurement information within the same control period (Tp is earlier than Tpl in FIG. 27). Thus, the controlling performance of the communication control system can be improved. The Tps, Tp, and the control period may need to be designed so that a control calculation time C satisfies the minimum time imposed on the communication control system.

Embodiment 4

Figure 28:
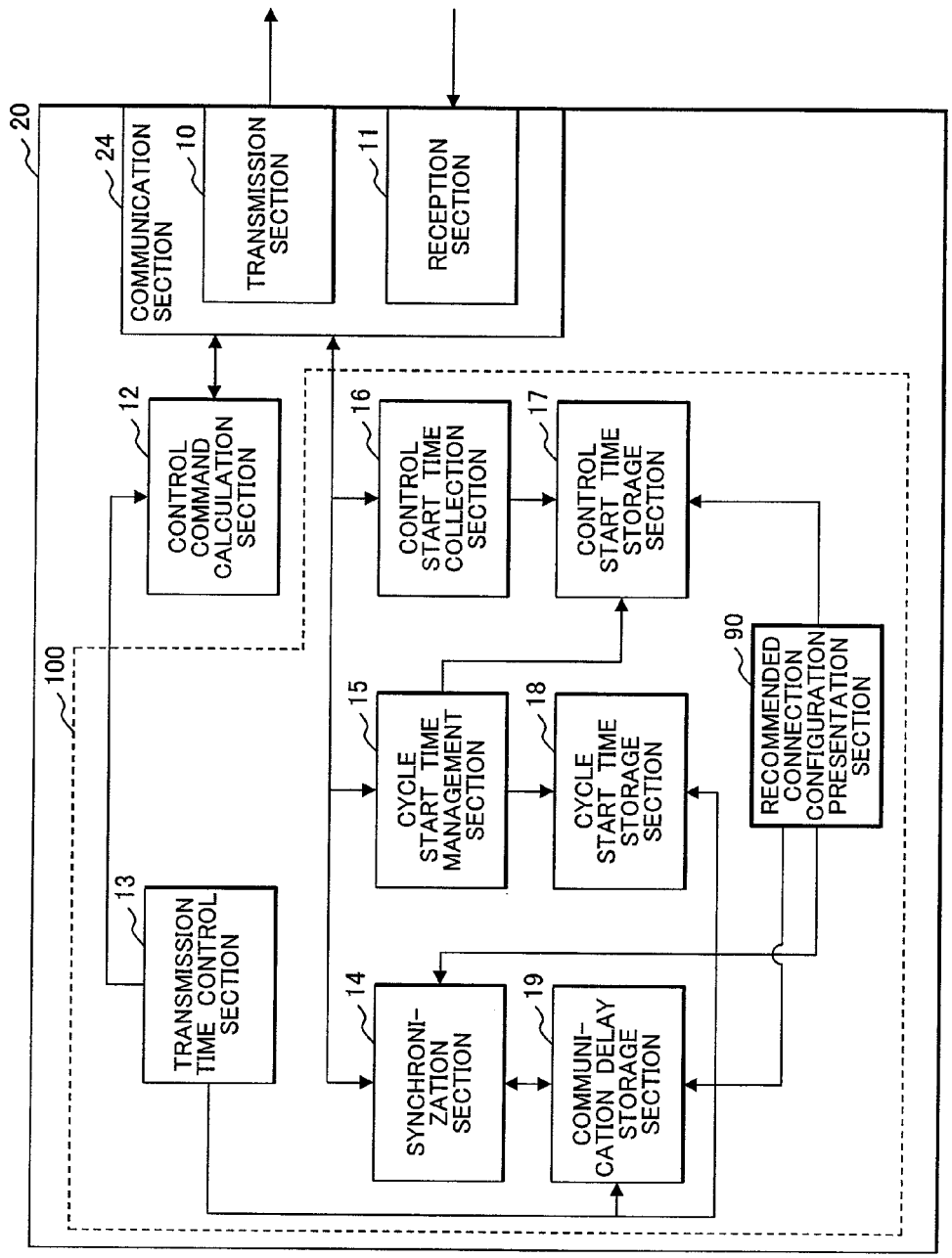
FIG. 28 shows the communication control unit to which a recommended connection configuration presentation section is added.

In FIG. 28, in comparison with FIG. 1, a recommended connection configuration presentation section 90 is added to the functional configuration of the communication control unit 20. Unless otherwise stated, the same functions and components as above are indicated by similar reference numerals in the following explanation.

The example of a system configured using the communication control unit 20 to which the present invention is applied is the same as that of FIG. 3 and FIG. 4. The hardware configuration of the communication control unit 20 is the same as that of FIG. 11. The software configuration which operates on the CPU 50 is the same as that of FIG. 12.

The functional configuration containing the recommended connection configuration presentation section 90 in FIG. 28 differs from the functional configuration of FIG. 1. The reason for containing this function is explained below.

For the purpose that all the control devices 21 receive a control command from the communication control unit 20 within the same control period, the shortest control period of the communication control system to which the present invention is applied is restricted to a time of the largest sum of a communication delay and a control start time for each communication control unit. The communication delay is proportional to the number of links from the communication control unit 20.

Therefore, when the communication control system permits change of the connection configuration of the network 22, the shortest control period of the communication control system may be shortened by changing the recommended connection. The recommended configuration presentation section 90 presents the shortened shortest control period when the shortest control period can be shortened by changing the connection configuration of the network 22 on the basis of the control processing times recorded on the control start time storage section 17, communication delays recorded on the communication delay storage section 19, and connection configuration information of the network 22 managed by the synchronization section 14.

In the presentation, a GUI display on a monitor, writing of the presentation information on a file, etc. are mentioned.

Some ways can be considered as an algorithm for determining the connection configuration presented by the recommendation configuration presentation section 90. For example, the configuration in which the control devices 21 are connected adjacent to the communication control unit 20 simply in the order from the control device 21 having the longest control start time is considered. Alternatively, as an illustration, the maximum value of the sums of the communication delays and control start times for the respective control devices 21 are calculated in all the combinations of the control devices 21 arranged at each position in a current connection configuration, and a connection configuration having the smallest calculated value is obtained.

The communication delay changes also with arrangement of the control devices 21 on a branching communication path. For example, in the connection configuration of FIG. 4, before a communication frame reaches the control device 21d, the frame has transferred between the control device 21a and control devices 21c. In this case, the communication delay becomes shorter when the control devices 21a to 21e are configured by a line topology. Therefore, when the control device 21 on a branching communication path exists, the presentation of the connection configuration by the line topology is also illustrated.

The present invention is widely applicable to a manufacture device etc. in a field which may need synchronization.

What is claimed is:

1. A communication control unit connected to one or more control devices via a network and communicating with the control devices, the communication control unit comprising:
at least one of a hardware processor or circuitry programmed to effect:
a control command calculator configured to calculate control commands for the control devices;
a synchronizer configured to synchronize times of the communication control unit and the control devices according to a predetermined synchronization protocol, and to measure a communication delay between the communication control unit and each of the control devices;
a communication delay storage configured to store the communication delay measured by the synchronizer;
a control start time period collector configured to collect a control start time period for each of the control devices, the control start time period being a time period from a time at which an operation of a control execution in each of the control devices starts until a time at which a significant operation of each of the control devices is actually made;
a control start time period storage configured to store the control start time period collected by the control start time period collector;
a cycle start time manager configured to determine, for each of the control devices, a time obtained by subtracting the control start time period stored in the control start time period storage from a start time of a common control execution cycle for the control devices as a cycle start time of each of the control devices;
a cycle start time storage configured to store the cycle start time determined by the cycle start time manager;
a communicator configured to communicate the control commands of the control command calculator, via the network; and
a transmission time controller configured to calculate, for each of the control devices, a time obtained by subtracting the communication delay stored in the communication delay storage from the cycle start time stored in the cycle start time storage, and to communicate the control command of the control command calculator to the network by use of the communicator before an earliest time of calculated times within the common control execution cycle.

2. The communication control unit according to claim 1, wherein the control command calculator is configured to calculate control commands for the control devices periodically, the cycle start time manager is configured to determine a time obtained by subtracting the control start time period stored in the control start time period storage from a predetermined time in a predetermined period as a cycle start time of the control device, and the transmission time controller is configured to calculate, for each control device, a time obtained by subtracting the communication delay stored in the communication delay storage from the start time stored in the cycle start time storage, and to periodically communicate a control command of the control command calculator to the network by use of the communicator before an earliest time of calculated times.

3. The communication control unit according to claim 1, wherein a communication frame communicated from the communicator includes control commands for the one or the plurality of control devices.

4. The communication control unit according to claim 1, wherein a control command for each control device is transmitted from the communication control unit by use of a different communication frame, and the communication delay storage is configured to store a time obtained by adding a wait time until a transmission time of the communication frame for the control device to the communication delay.

5. The communication control unit according to claim 1, comprising:
the at least one of a hardware processor or circuitry programmed to further effect:
a measurement information setting time manager configured to collect measurement information setting times of the control devices;
a measurement information setting time storage configured to store the measurement information setting times collected by the measurement information setting time manager; and
a transmission time controller configured to add the measurement information setting time stored in the measurement information setting time storage to a predetermined time, for calculating a time obtained by subtracting the communication delay stored in the communication delay storage, the adding and the calculating being conducted for each control device, and to communicate an acquisition request of the measurement information of the control command calculator to the network by use of the communicator at or after a latest time of calculated times.

6. The communication control unit according to claim 5, wherein the synchronizer has connection information about the network, and the communication control unit includes a recommended connection configuration presentor configured to present a recommended connection configuration of the network on a basis of network connection information stored in the synchronizer, a communication delay stored in the communication storage, and the control start time period stored in the control start time period storage.

7. The communication control unit according to claim 6, wherein the recommended connection configuration presentor is configured to present a configuration of connection adjacent to the communication control unit, the connection being made in a descending order of an order of the control start time periods.

8. A control device for communicating with the communication control unit via the network according to claim 1, comprising:
at least one of a second hardware processor or circuitry programmed to effect:
a second synchronizer configured to synchronize times of the communication control unit and the control devices;
a control executor configured to execute control processing in response to a control command of the communication control unit;
a control start time period manager configured to acquire the control start time period, and to present the control start time period to an outside;

a cycle starter configured to start the control executor periodically; and
a second communicator configured to communicate a control command of the control command calculator, via the network.

9. The control device according to claim 8, wherein the control executor is configured to execute a wait to make the control start time period constant.

10. The control device according to claim 8, wherein when the control start time period exceeds a predetermined control period, the control start time period manager is configured to present, to an outside, that the control start time period exceeds the predetermined control period.

11. The control device according to claim 8, comprising:
the at least one of the second hardware processor or circuitry programmed to further effect:
a measurement information exposer configured to expose measurement information of the control device; and
a measurement information setting time measurer configured to measure and expose a measurement information setting time.

12. A communication control system comprising:
a network;
one or more control devices; and
a communication control unit including:
at least one of a hardware processor or circuitry programmed to effect:
a control command calculator configured to calculate control commands for the control devices;
a synchronizer configured to synchronize times of the communication control unit and the control devices according to a predetermined synchronization protocol, and to measure a communication delay between the communication control unit and each of the control devices;
a communication delay storage configured to store the communication delay measured by the synchronizer;
a control start time period collector configured to collect a control start time period of the control devices, the control start time period being a time period from a time at which an operation of a control execution in each of the control devices start until a time at which a significant operation of each of the control devices is actually made;
a control start time period storage configured to store the control start time period collected by the control start time period collector;
a cycle start time manager configured to determine, for each of the control devices, a time obtained by subtracting the control start time period stored in the control start time period storage from a start time of a common control execution cycle for the control devices as a cycle start time of each of the control devices;
a cycle start time storage configured to store the cycle start time determined by the cycle start time manager;
a communicator configured to communicate the control commands of the control command calculator, via the network; and
a transmission time controller configured to calculate, for each of the control devices, a time obtained by subtracting the communication delay stored in the communication delay storage from the cycle start time stored in the cycle start time storage, and to communicate the control command of the control command calculator to the network by use of the communicator before an earliest time of calculated times within the common control execution cycle.

13. The communication control system according to claim 12,
wherein the control command calculator is configured to calculate control commands for the control devices periodically, the cycle start time manager is configured to determine a time obtained by subtracting the control start time stored in the control start time period storage from a predetermined time in a predetermined period as a cycle start time of the control device, and the transmission time controller is configured to calculate, for each control device, a time obtained by subtracting the communication delay stored in the communication delay storage from the start time stored in the cycle start time storage, and to periodically communicate a control command of the control command calculator to the network by use of the communicator before an earliest time of calculated times.

14. The communication control system according to claim 12,
wherein a communication frame communicated from the communicator includes control commands for the one or the plurality of control devices.

15. The communication control system according to claim 12,
wherein a control command for each control device is transmitted from the communication control unit by use of a different communication frame, and the communication delay storage is configured to store a time obtained by adding a wait time until a transmission time of the communication frame for the control device to the communication delay.

16. The communication control system according to claim 12, comprising:
the at least one of a hardware processor or circuitry programmed to further effect:
a measurement information setting time manager configured to collect measurement information setting times of the control devices;
a measurement information setting time storage configured to store the measurement information setting times collected by the measurement information setting time manager; and
a transmission time controller configured to add the measurement information setting time stored in the measurement information setting time storage to a predetermined time, for calculating a time obtained by subtracting the communication delay stored in the communication delay storage, the adding and the calculating being conducted for each control device, and to communicate an acquisition request of the measurement information of the control command calculator to the network by use of the communicator at or after a latest time of calculated times.

17. The communication control system according to claim 16,
wherein the synchronizer has connection information about the network, and the communication control unit includes a recommended connection configuration presentor configured to present a recommended connection configuration of the network on a basis of network connection information stored in the synchronizer, a communication delay stored in the communication storage, and the control start time period stored in the control start time period storage.

18. The communication control system according to claim 17,
wherein the recommended connection configuration presentor is configured to present a configuration of connection adjacent to the communication control unit, the connection being made in a descending order of an order of the control start time periods.

19. A communication control unit connected to plural control devices via a network and communicating with the control devices, the communication control unit comprising:
at least one of a hardware processor or circuitry programmed to effect:
a control command calculator configured to calculate control commands for the control devices;
a synchronizer configured to synchronize times of the communication control unit and the control devices according to a predetermined synchronization protocol, and to measure a communication delay between the communication control unit and each of the control devices;
a communication delay storage configured to store the communication delay measured by the synchronizer;
a control start time period collector configured to collect, for each control device of the control devices, a control start time period which is a time period measured from a time at which an operation of a control execution is initially initiated within the each control device, until a time at which a resultant predetermined control operation effected by the each control device actually occurs responsive to the operation of the control execution;
a control start time period storage configured to store the control start time period collected by the control start time period collector, for said each control device of the control devices;
a cycle start time manager configured to determine, for each of the control devices, a time obtained by subtracting the control start time period stored in the control start time period storage from a start time of a common control execution cycle for the control devices as a cycle start time of each of the control devices;
a cycle start time storage configured to store the cycle start time determined by the cycle start time manager;
a communicator configured to communicate the control commands of the control command calculator, via the network; and
a transmission time controller configured to calculate, for each of the control devices, a time obtained by subtracting the communication delay stored in the communication delay storage from the cycle start time stored in the cycle start time storage, and to communicate the control command of the control command calculator to the network by use of the communicator before an earliest time of calculated times within the common control execution cycle.

* * * * *